(12) United States Patent
Huang

(10) Patent No.: US 12,115,942 B2
(45) Date of Patent: Oct. 15, 2024

(54) MODULA VEHICULAR ROOF TOP CARGO PLATFORM

(71) Applicant: Jason Huang, Oakland Gardens, NY (US)

(72) Inventor: Jason Huang, Oakland Gardens, NY (US)

(*) Notice: Subject to any disclaimer, the term of this patent is extended or adjusted under 35 U.S.C. 154(b) by 68 days.

(21) Appl. No.: 18/445,005

(22) Filed: Feb. 24, 2023

(65) Prior Publication Data

US 2024/0286557 A1    Aug. 29, 2024

(51) Int. Cl.
*B60R 9/045* (2006.01)
*B60R 11/00* (2006.01)

(52) U.S. Cl.
CPC ......... *B60R 9/045* (2013.01); *B60R 2011/004* (2013.01); *B60R 2011/0052* (2013.01)

(58) Field of Classification Search
CPC .............. B60R 9/045; B60R 2011/004; B60R 2011/0052
USPC ........................................................ 224/321
See application file for complete search history.

(56) References Cited

U.S. PATENT DOCUMENTS

| | | | | |
|---|---|---|---|---|
| 3,002,664 A * | 10/1961 | Guevara | ................. | B60R 9/045 224/314 |
| 6,425,508 B1 * | 7/2002 | Cole | ....................... | B60R 9/045 224/330 |
| 9,827,915 B1 * | 11/2017 | Chappell | ................. | B60R 9/045 |
| 10,005,402 B2 * | 6/2018 | Huang | .................... | B60R 9/042 |
| 10,369,934 B2 * | 8/2019 | Wang | ..................... | B60R 9/045 |
| 11,535,166 B1 | 12/2022 | Huang | | |
| 11,706,034 B2 | 7/2023 | Beilman et al. | | |
| 2008/0283564 A1 * | 11/2008 | Dinsmore | ................ | B60R 9/04 224/319 |
| 2010/0327033 A1 * | 12/2010 | Payne | .................... | B60R 9/058 224/326 |
| 2020/0132194 A1 * | 4/2020 | Wang | ..................... | F16B 7/182 |
| 2021/0387575 A1 * | 12/2021 | Yang | ...................... | B60R 9/045 |
| 2023/0192003 A1 | 6/2023 | Ladha | | |

FOREIGN PATENT DOCUMENTS

| | | | |
|---|---|---|---|
| DE | 20 2013 103 414 U1 | | 8/2013 |
| DE | 20 2021 100 023 U1 | | 3/2021 |

* cited by examiner

*Primary Examiner* — Peter N Helvey
(74) *Attorney, Agent, or Firm* — Richard L. Strauss, Esq.

(57) ABSTRACT

The present invention relates to the field of vehicular roof top platforms that can be used to carry cargo as well as to enable individuals to stand thereupon. More specifically, the disclosed device relates to vehicular roof top platforms which are assembled from modular components enabling a great degree of control in regard to configuring the fore/aft size and width of such carriers. Furthermore, the present invention discloses roof top cargo platform which enable such platforms to be mounted parallel to the overall horizontal planar surface of a vehicle's roof despite such roofs presenting varying fore/aft as well as inboard/outboard curvature at the peripheral portions thereof.

13 Claims, 27 Drawing Sheets

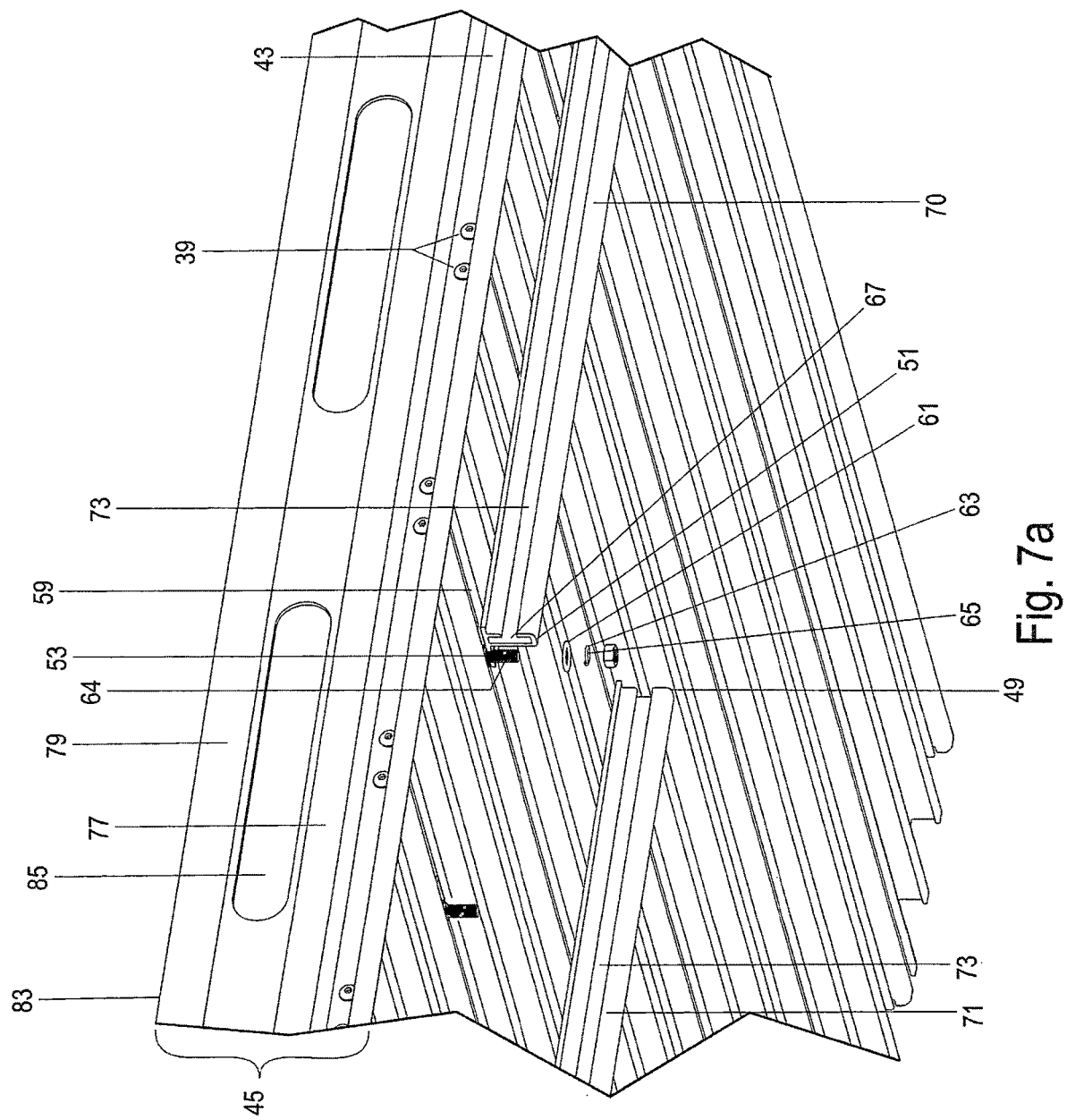

MODULA VEHICULAR ROOF TOP CARGO PLATFORM

TECHNICAL FIELD

The present invention relates to the field of vehicular roof top platforms that can be used to carry cargo as well as to enable individuals to stand thereupon. More specifically, the disclosed device relates to vehicular roof top platforms which are assembled from modular components enabling a great degree of control in regard to configuring the fore/aft size and width of such carriers. Also, the present invention discloses roof top cargo platforms which adapt and compensate for varying curvature of roof top surfaces.

BACKGROUND OF THE INVENTION

In the past, vehicular roof top platforms have been provided wherein a perimeter frame was utilized to suspend, support and attach such platforms to vehicle roofs. The platforms have been formed from individual roof top panels which were joined to form a relatively smooth platform. Such perimeter frames included, for example, two side bars—which are also referred to as side rails—mounted along the left and right side of a vehicle roof. Since such side rails were utilized as an attachment point for the platform to a vehicle roof, it was necessary to position such side rails so as to overly a vehicle's roof attachment features. Vehicle roof attachment features comprise roof bores/apertures (threaded and smooth), channels and flanges either provided, OEM, by vehicle manufacturers, or prepared after manufacture. In the prior art, side bars performed two distinct functions: defining the left and right extent of such platforms, and, acting as an intermediator, affixing the platform to the vehicle roof. In the prior art, panels utilized to form a platform were often affixed to a right and left side rail, and the side rail, in turn, was affixed to a vehicle roof. Therefore, the prior art platform carriers limited the left to right width of a carrier to the approximate width of vehicle roof top attachment features over which such side rails were necessarily placed. U.S. Pat. No. 11,142,131 discloses such a prior art roof top carrier which teaches the affixation of panels, utilized to form a platform, to side rails—or the left and right rail as well as front and rear rails—which form a perimeter frame—"wherein the platform is configured to be joined to the modular frame and not to the roof of the vehicle, so as to only be fixed to the vehicle, so as to only be fixed to the roof of the vehicle indirectly via attachment to the modular frame." (See U.S. Pat. No. 11,142,131 at col. 18, lines 64-67). US patent publication US/2021/03880042 a "ladder-style vehicle rack systems having elongated side rails following left and right vehicle roof sides, with a plurality of cross rails traversing the roof at intervals to form a grid of one or more rectangular areas . . . " (See US/2021/0380042). The disclosed roof rack utilizes a joint formed between the left and right side rail to affix the rack to a vehicle roof. (US/2021/0380042, paragraphs [0037]-[0038]). This example of the prior art, once again, necessarily limits the left and right width of the carrier to the distance between left and right side rails so that they are positioned above roof mounting features. Prior art perimeter frames of certain prior art platforms, included, in certain instances, a front and rear end rail connecting the left and right side bars at the fore and at the aft terminus of each side bar, which, in some instances were also utilized as intermediate attachment 93 points for the carriers to a vehicle roof.

When used, throughout this specification and within the claims, the term "fore" means a position toward the front of a vehicle upon which a platform is mounted. The term "aft" refers to a position toward the rear of a vehicle upon which a platform is mounted. In the past, such side rails often were often formed and shaped from flat bar stock which included various bends. For example, the side rails often included: 1. a lower portion—closest to a roof surface—which was bent form and/or shaped to lie relatively parallel to the horizontal surface of a vehicular roof upon which the platform was to be mounted, 2. a relatively vertical section running upwards, from the inferior portion, substantially perpendicular to the plane of a vehicle roof so as to provide a convenient point of attachment to the right and left ends of a panel supported by the left and right side rails, and an upper portion that might, for example, be bent slightly inboard, toward the center of a roof upon which the platform was mounted (so as to better retain cargo placed upon the platform). The term "inboard" when describing a relative position throughout this specification and claims, refers to a position toward the longitudinal center line of a vehicular roof upon which a platform is mounted. The term "outboard" when used to describe a relative position throughout this specification and claims, refers to a position toward the right and left extent (or edges) of a roof which run generally parallel to the longitudinal center line of a roof, but are positioned on the extreme right and left portion of a vehicular roof.

Although aforementioned prior art side rail shape and configuration, with or without the above-described angulation, could provide a certain degree of strength to vehicular roof top platforms, such a flattened shape does not provide optimal rigidity and is subject to failure, such as bending and crimping, due to load stress as well as vehicle movement. Such rigidity becomes of great concern as the weight of objects or persons placed or standing upon the platform supported by such side rails increases. It would be highly advantageous if a modular vehicular roof top platform could be designed and disclosed having right and left side rails shaped and configure to provide enhanced rigidity and resistance to deformation under cargo load and vehicle movement so as to enhance overall platform strength and resistance to deformation.

In regard to prior art roof top platforms, typically, individual platform segments or, in other words, and having equal meaning "panels," having demonstrated a relatively smooth top horizontal surface. Thus, prior art individual platform segments, as well as the fully assembled platforms they formed demonstrated relatively smooth, low friction, top surfaces upon which cargo could be placed. Such smooth surfaces were less than effective in minimizing the shifting of cargo placed upon such platforms and equally undesirable in terms of providing a non-slip or reduced slip surface for individuals who, in some instances, might be standing upon such platforms. It would be highly advantageous if such panels and well as fully assembled platforms they were used to form, were designed, shaped and configured, in such a manner as to increase stability of cargo as well as individuals standing thereupon.

The means utilized by the prior art to connect individual panel members together to form a complete roof top cargo platform often required the use of bolts, screws, brackets or other hardware accessories. In addition, those examples of prior art panel assembly utilizing the mating and manipulation of panel side walls formed and shaped to lock together have been cumbersome to assemble and have required much manipulation and skill to make such attachments. It would be very beneficial if a cargo platform were to be disclosed, assembled from panels having edges that easily, and with little to no manipulation, could be slipped together to form a platform with strong inter-panel joints.

As mentioned above, prior art cargo platforms often utilized left and right side rails, overlying roof attachment features (which are equally referred to herein as roof attachment points), as both an intermediary point of attachment of the platform to the vehicle roof as well as attachment points for individual panels which are joined to form an assembled platform. Often time, these roof top attachment features are arranged in a linear manner, parallel to the longitudinal center line of a vehicle roof, but well inboard in relation to the right and left edges (or, in other words right and left extent) of the roof. Thus, as mentioned above, prior art roof top platforms were often limited to a width (of the actual cargo platform) equal to the distance between the left and right linearly arranged attachment points. Thus, such prior art side rails often restricted a platform width to be substantially less than the width of the vehicle roof upon which it was mounted. It would be highly advantageous if, in addition to left and right side rails, a modular vehicular roof top cargo platform was disclosed that utilized separate rails for affixing the platform to a vehicle roof so as to allow side rails, defining the left and right extent of the platform, to extend further outboard in relation to roof attachment features.

It is quite common for the majority of vehicles, such as trucks, vans and cars, to include a roof formed and configured to lie parallel to the surface upon which the vehicle was positioned. However, not all vehicles have such a relatively flat roof which lies in such a parallel plane. In addition, it is quite common to find that, especially in the vicinity of roof mounting features (such as threaded and smooth mounting bores, flanges, rails and studs), the contour of the roof slopes downward, especially at the location of roof top mounting point features. Also, in some instances, a vehicle roof may include a fore/aft slope in these same as well as other areas. Such a slope makes it difficult to obtain a flush fit between the bottom surface of a roof bracket utilized to attach a roof top panel such features and the surface of the roof the bracket contacts. It would thus be highly advantageous to disclose a modular vehicular roof top cargo platform that incorporated roof mounts that could be adjusted to correct for such roof slope so as to allow a cargo platform to lie generally parallel to the horizontal surface of the vehicles roof and the surface upon which the vehicle was positioned.

SUMMARY OF THE INVENTION

Now, in accordance with the present invention, a modular vehicular roof top cargo platform is disclosed which compensates for roof slope that would otherwise prevent the platform from being parallel to the horizontal plane of the vehicle roof, provides greater strength and rigidity while easily adapting to varying platform width and length requirements. Furthermore, the cargo platform of the present invention utilizes independent inboard platform mounting rails so as to enable the width between the left and right side rails, and the platform extending therebetween, to exceed the width between left and right roof mounting features. The cargo platform of the present invention is comprised of a left and right side rail, a left and right platform mounting rail, a plurality of: panels, roof mounting brackets and elongated curved alignment bushings. Certain preferred embodiments of the present invention may further comprise fore and aft end rails.

The left and right side rails of the present invention are assembled from two or more side rail segments so as to enable formation of fully assembled side rails of a selected length—which is also determinative of the length of the fully assembled platform attached thereto—. Each side rail segment, as well as the fully assembled side rails they form, includes a lower "C" shaped channel section which lies below and is in vertical alignment with a lower hollow tubular section, which, in turn, lies below, and is in vertical alignment with a side rail assembly section, which, in turn is below and vertically aligned with an upper hollow tubular section. Thus, all four sections of each side rail section lie in vertical alignment—which increases segment strength—. The term "vertical alignment" as used throughout this specification and claims—in reference to the side rail segments and left and right side rails assembled therefrom refers to, in preferred embodiments of the present invention, the four above-described sections comprising the side rail segments being, in a cross sectional view, in vertical alignment. More specifically, the "C" shaped channel section, lower hollow tubular section, side rail assembly section and upper hollow tubular section are arranged and positioned so that, in a cross sectional view, a vertical line, bisecting each section will align, one with the other, so that all four sections are in vertical alignment. Such an arrangement imparts greater strength to the side rails as opposed to embodiments wherein the segments are offset, one from the other. The side rail segments of the present invention are purposely provided in a plurality of different lengths. In this way, a fully assembled side rail of a desired length can be produced by selecting and combining side rail segments demonstrating such lengths that will yield, upon assembly, the desired side rail length.

The lower "C" shaped channel section includes bores (which may also be described herein as "apertures") formed on the inboard portion thereof that enable assembly screws passing therethrough to attach the side rail segments (and the side rails formed thereby) to the left or right end of the individual panels which form the platform. (As mentioned above, the term "inboard" refers to a relative position directed inward, towards the longitudinal center-line of a vehicle roof, upon which the modular vehicular roof platform of the present invention is mounted. The term "outboard" as utilized throughout the specification and claims refers to a relative direction towards the right and left extent (or boundary) of a vehicle roof where the roof intersects with the side portions of the vehicle. The upper and lower tubular section of each side rail segment are formed as round hollow tubes. They are especially shaped and configured to enable adjacent side rail sections to be joined via inserts such as, for example, plastic or metal inserts. Such inserts not only join, but act to align adjacent side rail segments, as discussed in more detail, below. The side rail assembly section, which lies between the upper and lower tubular sections of the side rail segments, is formed as a flat section with bores formed there through proximal to the fore and aft end of each segment. In addition to the afore-mentioned side rail inserts, side rail segment attachment brackets are utilized to attached adjacent side rail segments to one another. These attachment brackets have a flat central portion and upper and lower, horizontally disposed, assembly channels which are at least partially threaded. The flat portion of these brackets include bores which are located and formed so as to align with the bores formed proximal to the fore and aft end of each side rail segment. Machine bolts or screws, for example, are utilized to attach these brackets to the inboard side of the fore and the aft end of two side rail segments to be joined. In a preferred, but not exclusive method of joining adjacent side rails, a plastic or metal insert, placed within the hollow proximal and distal end of the upper and lower tubular sections, is utilized to align and join, for example, the aft end of a first side rail segment to the fore end of a second side rail segment. As mentioned above, the present invention provides side rail segments demonstrating a plurality of varying lengths so that they may be joined, as described above, to form a fully assembled side rail of a desired length.

After placement of the plastic or metal inserts within the upper and lower tubular sections of a first and second segment, the segments are compressed together fully seating the metal inserts within the upper and lower tubular sections. The segments so joined are also aligned in such a manner as to enable the upper and lower horizontally disposed assembly channels of a side rail segment attachment bracket attached, for example, to the aft end of a first segment, to come into alignment—in regard to the longitudinal center of said channels—with the upper and lower assembly channels of a side rail segment attachment bracket attached to the fore end of a second side rail segment. Machine screws, inserted into the upper and lower horizontally aligned assembly channels then engage threads formed therein so as to firmly affix both brackets to one another so as to firmly attach the first and second side rail segments to each other.

The panels of the present invention include a top surface, bottom surface, right end, left end, fore end and aft end. The panel length is defined by the distance between the left and right ends of each panel. The present invention thus provides a plurality of panel lengths in accordance with the width of the platform desired for a given application—as one panel is utilized to span the entire width of a platform—. Simply put, the length of the panel is equal to the width of the platform formed by multiple panels. Therefore, it is preferred, for a given roof application (intended width), that all panels demonstrate the same length. The distance between the fore and aft end of each panel is described as panel width. The cumulative width of all of the panels joined together in assembling a platform will be equal to the fully assembled platforms total length. It is preferred, but not required, that the width of each panel intended for a particular vehicle demonstrate the same width so that, as discussed in detail below, assembly apertures on the left and right ends of each panel will properly align with assembly bores located through the inboard surface of the "C" shaped channel section of the side rails.

The top surface of each panel is not smooth, but rather shaped and configured to include ridges and grooves so as to increase friction and form a surface resistant to cargo shifting or personnel slipping. The fore and aft ends of each panel are formed, shaped and configured to include locking extension arms and extension arm receiving grooves, respectively, along the entire length of each end which are especially adapted to enable the extension arm to mate with and form a strong connection within thus enabling the panels to be easily compressed together to form a strong snap attachment to one another. The locking extension arm and the extension arm receiving groove are designed, configured and formed so that the adjacent panels to be assembled can be placed on a flat surface and compressed together without the need for manipulating the angle between the fore end of one panel and the aft end of another. For example, a rubber mallet, may be utilized to joint two such panels which are first placed on a flat surface, such as a vehicle roof, and tapped together. The panels are also united to one another via attachment at the right and left end of each panel to the lower "C" channel section of the side rail utilizing screws which pass through bores formed within the "C" channel's inboard wall and thereafter enter assembly channels formed in the right and left ends of each panel. In certain preferred embodiments, the locking extension arm can be formed on the fore or aft end of a panel as can the extension arm receiving groove.

Upon attaining attachment of two adjacent panels (at the junction of the fore end of one panel and the aft end of an adjacent panel) a flange bolt receiving channel, running along the entire length of the panel, is formed below that junction. The channel is especially shaped and configured to hold the head portion of a flange bolt in such a manner as to enable the bolt to slide in an inboard/outboard direction. A slot, having a reduced width as compared to the flange bolt receiving channel, communicates with and is positioned below the channel enabling the threaded portion of the flange bolt to pass through the slot in a downward direction while the "head/flange" portion of the flange bolt remains within the channel. During assembly of the platform, the position of the flange bolt within the channel is adjusted so that the threaded portion of the bolt overlies a bore, formed through the upper flange portion of the platform mounting rail. The threaded portion of the bolt is inserted in and passed through this bore. Thereafter, a washer and nut, for example, is threaded onto the bolt to, initially, loosely affix the panel to the mounting rail. As discussed below, the flange bolt is loosely affixed, at first, in order to enable proper positioning of the platform attachment rail relative to the vehicle roof mounting feature to which it will be attached via an intermediary roof mount. Such adjustability also enables centering of the platform in regard to the center line of the vehicle roof.

The left and right platform mounting rails are formed by joining two or more platform mounting rail sections into a fully assembled left and right platform mounting rail of a desired length and width. The left and right platform mounting rails, as well as the platform mounting rail segments which are joined to form same, are generally shaped as an elongated bars having a top (flange like) surface, a bottom surface, an inboard surface (positioned during assembly so as to face in an inboard direction of a vehicle roof to which it will be mounted and an outboard section. The outboard section of the platform mounting rail includes a flange bolt assembly receiving channel and a slot—demonstration a reduced with—communicating with the channel located along the entire length thereof. The flange bolt assembly receiving channel is formed and configured, in preferred embodiments, to receive a flange bolt assembly. More specifically, the flange bolt assembly receiving channel is formed so that the flange and bolt heads held—are slideably—held within the channel while the threaded ends of the assembly bolts pass through aforementioned slot and are slidable along the outboard slot in a fore/aft manner. This provides a bolt orientation wherein the bolts lie parallel to the surface of the platform with the threaded portions extend outboard, away from the rail.

The present invention utilizes the right and left platform mounting rail (which is positioned adjacent to vehicular roof mounting features) to attach the platform to the vehicle roof via a plurality of roof mounting brackets. The platform mounting rail is advantageously attached to the platform at a point which is inboard relative to the right and left ends of the platform as well as the left and right side rails so as to allow the platform to exceed, if desired, the width of the roof mounting features.

As mentioned above, in a preferred method of assembly, once all of the panels utilized in a platform have been joined to one another, the flange bolts extending downward from the flange bolt receiving channel are loosely tightened to the platform mounting rail. This allows the platform mounting rails position to be adjusted in an inboard/outboard manner, until the rail is in a position that enables a roof mount, attached to the rail (described below) to overly and engage a roof mounting feature. The fore/aft adjustment of the left and the right platform mounting rail also enable centering of the platform in regard to the longitudinal center line of the vehicle's roof. The flange bolt assembly's position, within the flange bolt assembly receiving channel is likewise able to be adjusted, but in a fore/aft direction. This enables, as discussed below, a roof bracket, attached—loosely initially- to the platform mounting rail, to slide along the flange bolt assembly channel until a proper fore/aft position is achieved that enables engagement of a roof mounting feature (such as a threaded bore or rail with a receiving clip nut). Once such a position is attained, a washer and nut, for example, threaded onto the threaded end of bolts extending from the assembly lock the fore aft position of the roof bracket.

The roof bracket of the present invention includes an upper and lower section. It is utilized to attach the platform mounting rail (which, in turn, is affixed to the platform), to the roof a vehicle by, for example engagement of a roof mounting feature such as a single or dual stud, smooth bore, threaded bore, clip nut or channel. In preferred embodiments, the upper section of the roof bracket generally is shaped as a flat rectangular plate having a fore end, an aft end and a longitudinal axis running therebetween. It is preferred that the upper section of the roof bracket include slot like bores adjacent to the fore and aft ends of the upper section. The slot like bores are oriented so as to extend in an upward/downward manner (when the bracket is positioned for attachment to a roof). The orientation of the fore and aft slots may also be described as running perpendicular to the longitudinal axis of the upper section of the roof bracket. These slots enable the bracket, (after being loosely affixed to the threaded ends of bolts extending outboard from the flange bolt assembly), to, for example, tilt upward, towards the fore end of the vehicle roof to compensate for a downward fore/aft slope at that portion of the roof where the bracket is affixed. In this position, the bracket would tilt downward at the aft end of the bracket. This adjustment could be used, for example, to compensate for a roof that slopes downward, in a fore direction, at the point of attachment of the roof bracket to a roof mounting feature. In other words, in situations wherein, at the point of attachment of the bracket to a vehicle, the roof slopes upwards towards the fore end of the roof. Such adjustability allows the bracket to level the platform to which it is attached in such instances. Thus, instances wherein a vehicle roof is generally canted towards the fore or aft ends of the roof in the vicinity of roof mounting features, such adjustment can enable the platform supported by the bracket to be level in relation to the surface upon which the vehicle is situate, in the fore/aft aspects—it allows the platform to lie in a plane parallel to the horizontal plane of the vehicle's roof wherein such slope is not present—.

Certain preferred embodiments of the present invention are intended for application to vehicle roofs displaying slope, or, as it may also, with equal meaning be described as "cant" running inboard/outboard in the region of roof attachment features. Such embodiments include a roof mount especially configured to compensate for such inboard/outboard slope. In such embodiments, the upper section of the roof bracket is substantially flat whereas the lower section is formed as a curved section having a convex upper surface and a concave bottom surface. The lower section of the roof bracket includes a fore end, an aft end and a longitudinal axis running therebetween. The lower section extends at an angle of about ninety degrees outboard relative to the upper section of the bracket. In preferred embodiments of the present invention, the lower section of the roof bracket is designed, shaped and configured to have a concave bottom surface and a corresponding convex upper surface defining an arc running in an inboard/outboard orientation. In preferred embodiments of the present invention, the curvature of the lower section of the roof bracket is defined by a radius of curvature of from about 22 to about 33 millimeters, and, more preferably, from about 24 to about 31 millimeters, and still further preferred, a radius of curvature of about 27.5 millimeters (wherein the upper surface of the top surface of the lower section is convex and the bottom surface is concave. As described in more detail below, the convex shape of bottom surface of the lower section of the roof mount bracket, in combination with the convex top surface of the curved elongated bushing it pivots about (in an inboard/outboard manner, enables the roof bracket to provide an adjustment range, as to the inboard/outboard angulation of the roof bracket, of from about 0 to about 7.5 degrees.

It is preferred that the lower section of the roof bracket includes three bores for placement of bolts, screws or other fasteners attaching the bracket to a roof feature. The positions of the three bores may be described as a right bore, a left bore outboard and a central bore or, relative to their position when mounted to a vehicle roof, a central bore, a fore bore and an aft bore. The bores of the lower section are advantageously formed as slots running in an inboard/outboard orientation, or, as the slot orientation may also be described, running perpendicular to the longitudinal axis of the lower section. In certain preferred embodiments, the fore and aft bores may be formed as a square openings while the central bore may be formed and shaped as a slot running perpendicular to the long axis of the bracket. Use of a square shaped bore enables the bracket to be fitted to vehicle roofs having double roof attachments features, such as double: studs, smooth bores, threaded bores or clip nuts. The distances between such double roof attachment features may vary between vehicle roofs. A square opening provides additional leeway in regard to the inter-spacing between such features. In embodiments of the present invention wherein the intended application of the cargo platform is a vehicle roof devoid of the afore-mentioned inboard/outboard slope, the lower section of the roof bracket may have a flat contour.

In embodiments of the present invention intended to compensate for inboard/outboard slope of a vehicle roof, an elongated curved alignment bushing is utilized, demonstrating the same curvature as the lower section of the roof bracket described above. In addition, the bushing includes a fore end and an aft end with a longitudinal axis running therebetween. The elongated curved alignment bushing is especially shaped and configured to lie below and conform with the curvature of the lower section of the roof bracket. For this reason, the bushing demonstrates a convex upper surface which matches and mates with the bottom concave surface of the lower section of the roof bracket and a relatively flat bottom surface. During attachment of the carrier to a vehicle roof, the elongated curved alignment bushing is positioned between the bottom surface of the lower section of the roof bracket and the vehicle roof feature to which the bracket is attached. The elongated curved alignment bushing also may advantageously include three bores which may also be shaped as slots running inboard and outboard, perpendicular to the longitudinal axis of the bushing. However, in certain preferred embodiments, the fore and aft apertures of the elongated curved alignment bushing are shaped as square openings to allow for variations in the spacing between dual style roof mounting features as discussed in more detail, below.

The lower curved section of the roof bracket, in combination with the elongated curved alignment bushing is useful in correcting the position of the bracket and the platform to which it is attached when the roof, in the vicinity of the roof mount feature to which the lower section of the bracket and elongated bushing will be affixed, includes an inboard/outboard cant, or what may also be described as a right/left slope. By placing the relatively flat bottom surface of the elongated bushing upon the curved surface of the roof until the bushing, which is formed of a flexible material, lies substantially flat, and thereafter sliding the bottom concave surface of the lower section of the roof bracket in an inboard direction along the convex upper surface of the bushing, the bracket can be mounted so that the upper section thereof is perpendicular to the horizontal plane defined by the majority of the surface of a vehicle's roof (or the surface upon which the vehicle is situate). Therefore, the platform affixed to the vehicle by the bracket can, despite such an inboard/outboard cant, be placed in a horizontal plane parallel to the vehicle roof (in areas of the roof inboard from the right and left edges thereof, where an inboard/outboard cant is absent). Such adjustment of cant provided by the combination of the elongated curved alignment bushing and the concave bottom surface of the lower section of the roof bracket an also allow a platform to lie parallel to a vehicle roof although planar, demonstrating a continuous slope running for instance, downward from the front to the rear of such vehicles.

In many instances, the majority of a vehicle's roof surface, other than areas directly adjacent to the right and left extent of the roof and, in some instances, directly adjacent to the fore/aft extent of a roof, is generally planar and parallel to the surface upon which the vehicle is situate. The term "horizontal plane of a vehicle's roof surface" as well as "the horizontal plane of the majority of a roof's surface" refers to the flat planar surface of a vehicle roof, in areas other than the aforementioned peripheral portions (or edges) of the roof, where curvature may be incorporated to enable joining to the roof with the left and right sides of a vehicle as well as the front and rear portions thereof. For example, a vehicle roof, proximate to the front windshield, back windshield back doors or panels, often incorporate a slope an avoid hard right angle junctures. Similarly, area of a vehicle roof adjacent to the left and right side of the vehicle, may include slope to avoid a hard right angle where the roof meets side windows, side doors and side panels. All of these areas often exhibit some slope, or with equal meaning, slant or curvature which most often descends from the roof towards the front, back and sides of a vehicle. In regard to downward slope adjacent the side of a vehicle roof—which may also be termed inboard/outboard slope, the elongated curved adjustment bushing of the present invention, in combination with the curved lower section of the roof bracket can compensate for such a slope an enable level mounting of the platform. The specific details and embodiments of the present invention are presented, below. Certain embodiments of the present invention are utilized in instances wherein there is no inboard/outboard cant (or slope) at the point of attachment of the roof bracket to a vehicle roof. In such instances, the lower section of the roof bracket is formed in a flat rectangular shape and there is no need for utilizing the elongated curved bushing of the present invention.

BRIEF DESCRIPTION OF THE DRAWINGS

FIG. 3b is an exploded view of the partially assembled modular roof top cargo platform illustrated in FIG. 3a.

FIG. 3c is a top left isometric exploded view of a partially assembled preferred embodiment of the modular cargo platform illustrated in FIG. 3a.

FIG. 7a is a bottom left isometric view of a partially assembled preferred embodiment of the modular vehicular roof top cargo platform of the present invention including an exploded view of platform mounting rail segments incorporated therein.

FIG. 13b is a sectional view of the two side rail segments illustrated in FIG. 13a.

DETAILED DESCRIPTION

Figure 1:
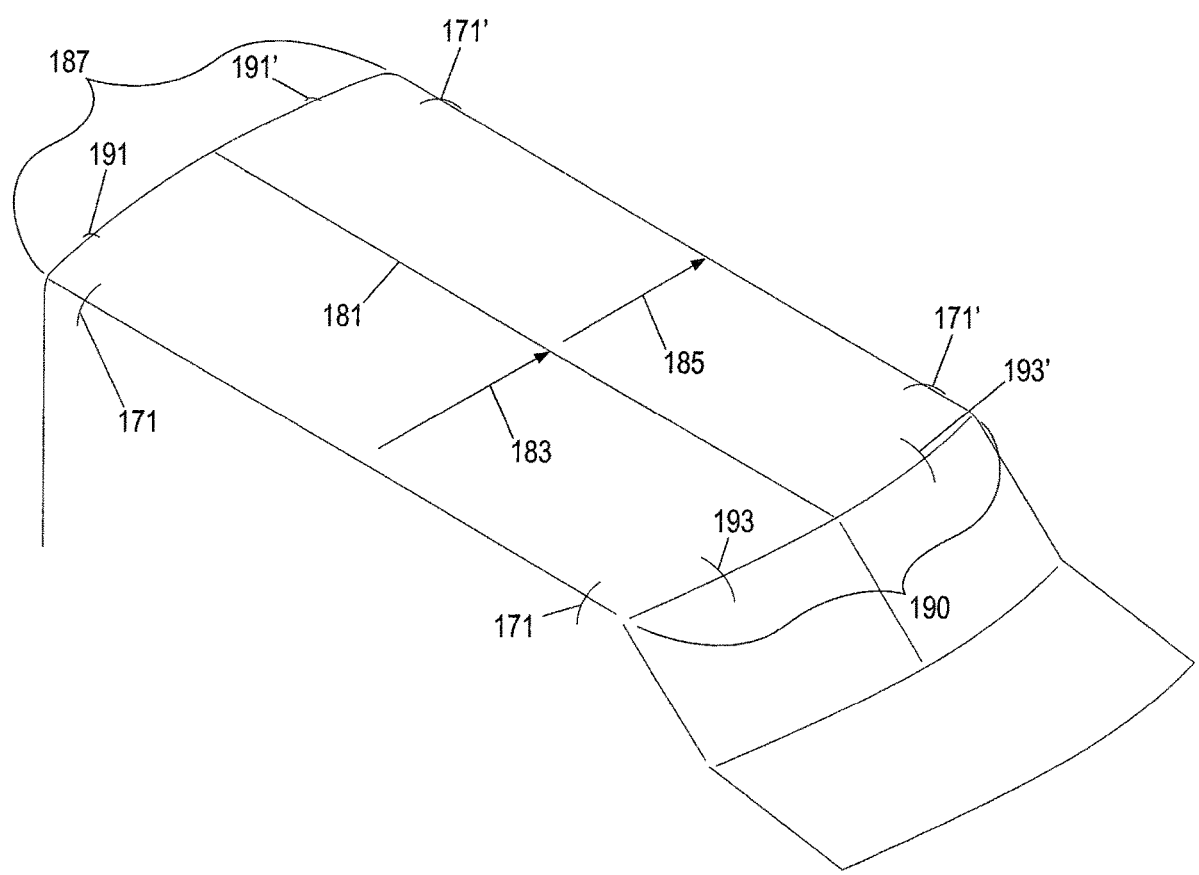
FIG. 1 is a top right isometric schematic line drawing of a generic vehicle roof.

For clarification of the relative direction and positions utilized herein to describe the roof top platform of the present invention as well as vehicle features, FIG. 1 is offered to provide clear definitions thereof. More specifically, FIG. 1 illustrates the curved areas of a vehicle roof, or, which may also be described as areas of a vehicle's roof that demonstrate cant. These areas are generally at the right and left extent of a vehicle's roof where the roof tends to curve downwards towards the right 171 and the left 171' sides of the vehicle with what is described herein as an inboard/outboard cant. These areas of roof curvature are also described, with equal meaning herein, as left/right slope. The longitudinal centerline 181 forms the relative basis of the term inboard/outboard as utilized throughout this specification and claims. The term "inboard" refers to a relative position moving towards, sloping towards or oriented towards 183 the longitudinal center of the vehicle roof. The term "outboard" refers, to a relative position moving away from, sloping away from or oriented away from 185 the longitudinal center of the vehicle roof. The term "fore" refers to, as used throughout this specification and claims a relative position moving towards, sloping towards or oriented towards the front 190 portion of a vehicle's roof. The term "aft" refers to, as used throughout this specification and claims a relative position moving towards, sloping towards or oriented towards the rear 187 portion of a vehicle's roof while the term while the term "fore" refers to the front portion 190 of a vehicle's roof. The term "fore/aft cant" and equally, "fore aft slope" as used throughout this specification and claims slope of a vehicles roof running from the front to rear 191/191' as well as rear to front 193/193' of a vehicles' roof.

Figure 2:
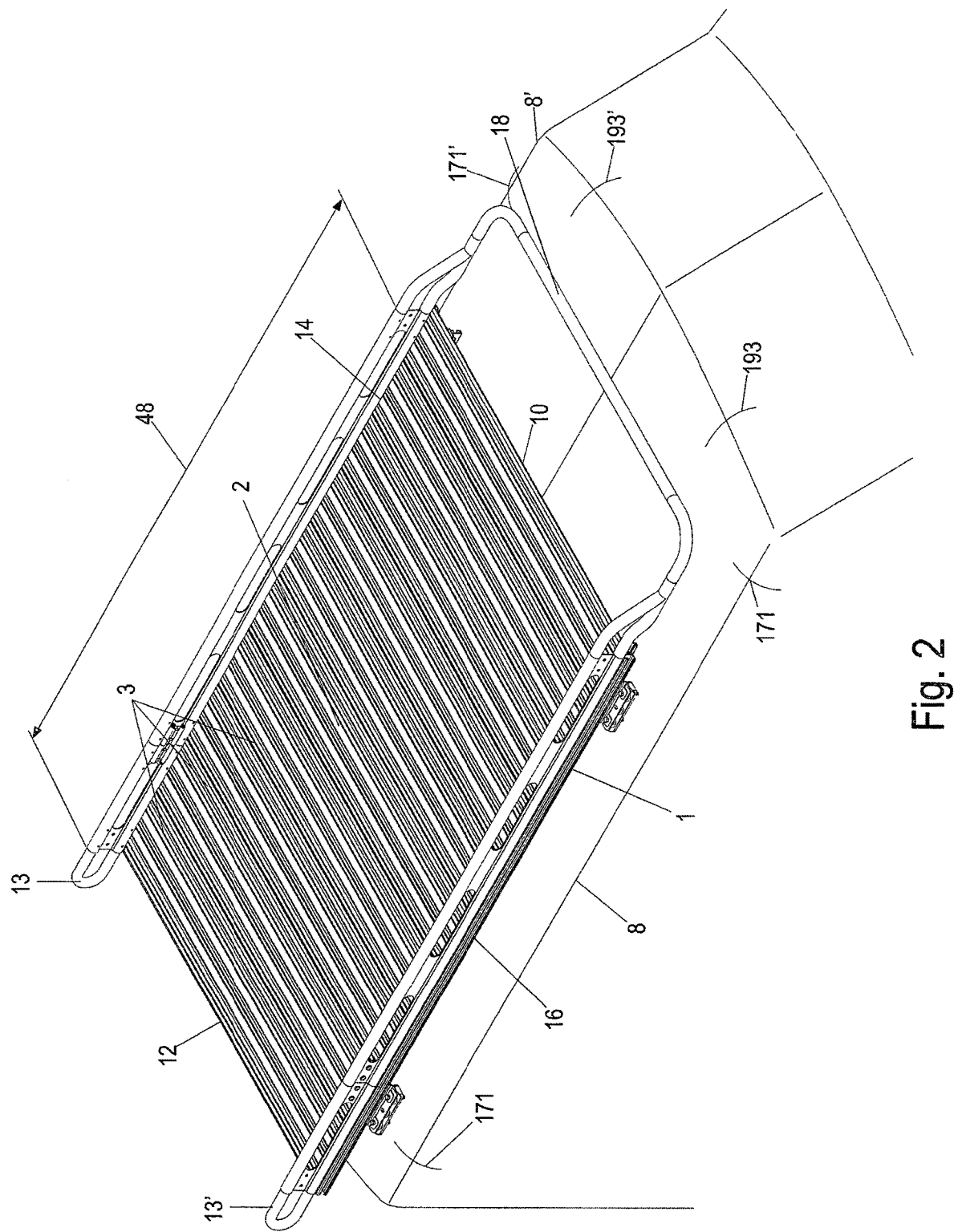
FIG. 2 is a top right isometric view of a preferred embodiment of the modular vehicular roof top cargo platform of the present invention.
Figure 3A:
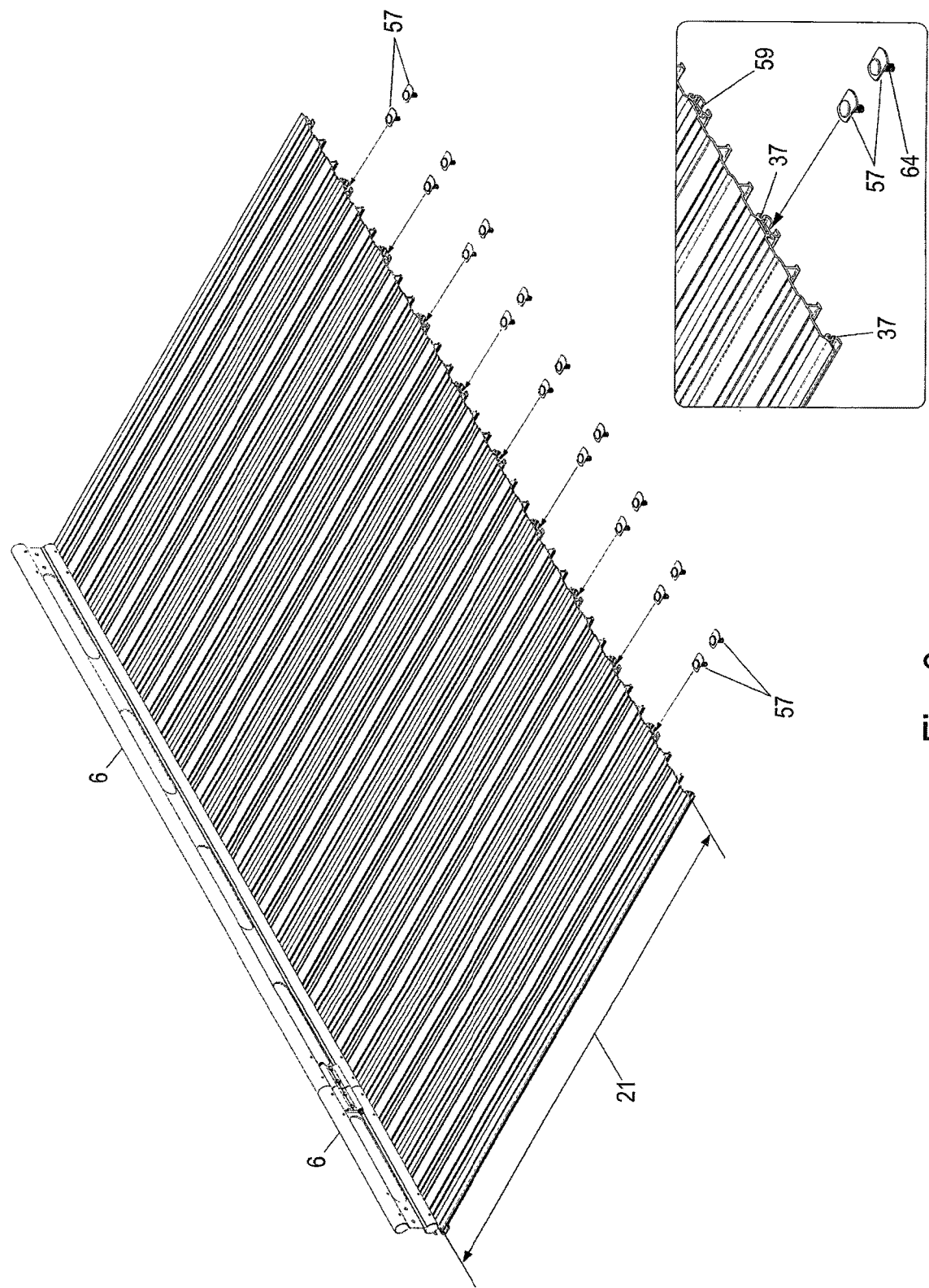
FIG. 3a is a top left isometric view of a partially assembled modular roof top cargo platform illustrated in FIG. 1.
Figure 3B:
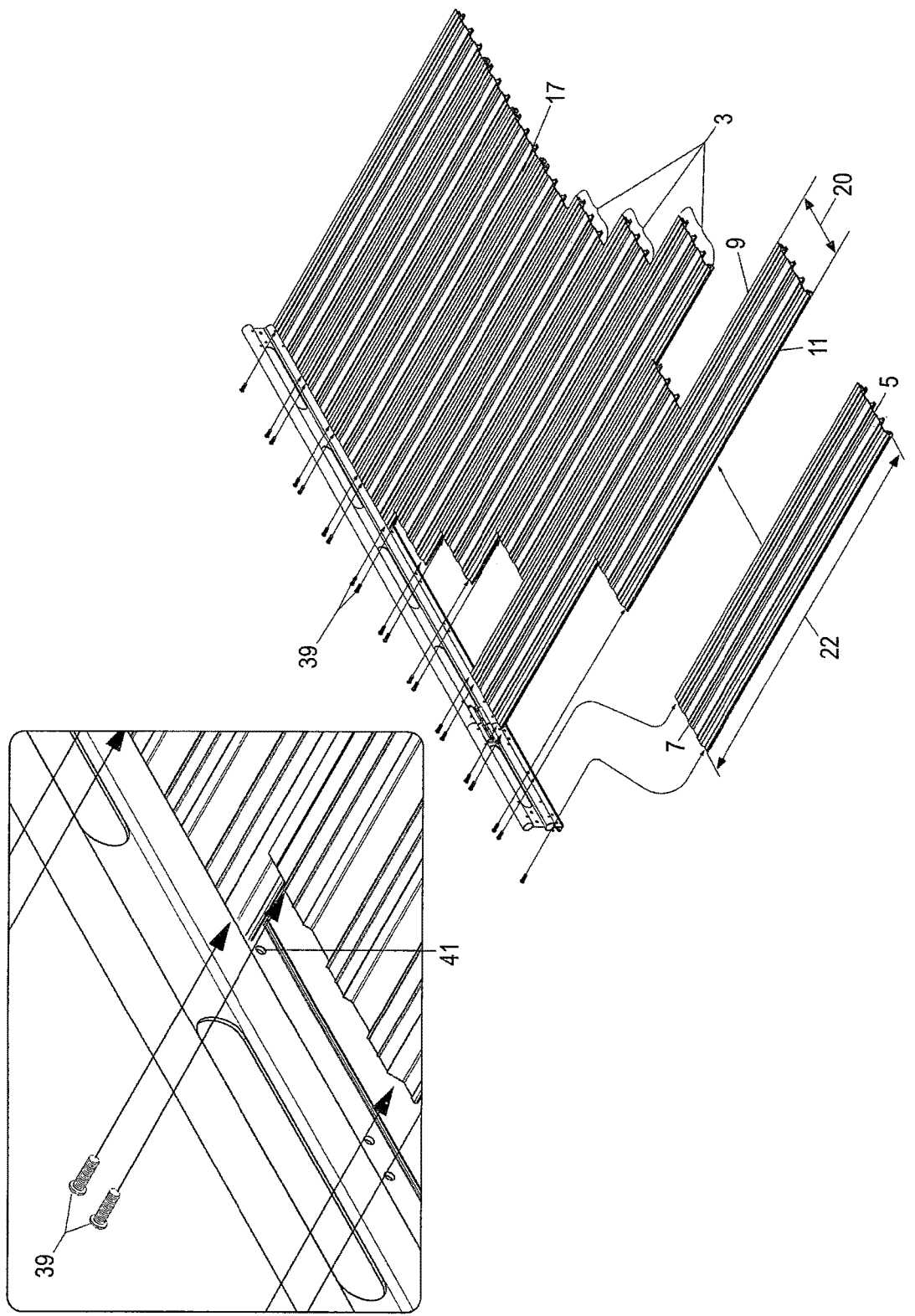

The modular vehicular roof top cargo platform 1, of the present invention, as illustrated in FIGS. 2, 3a and 3b, is assembled by joining individual panels 3 especially designed, shaped and configured for a simplified and rapid joining thereof to form a fully assembled platform 2. The fully assembled platform can be described as having a fore end 10, an aft end 12, a right side 16 and a left side 14. The sides and ends of the assembled platform are so designated relative to the positioning of the platform upon a vehicle. In certain preferred embodiments, the front end bar, or, as it may also be referred to, the front accessory bar 18 is, as shown in the figures, is mounted towards the front of a vehicle upon which the platform is mounted. Rail ends 13/13' may be utilized to join the hollow upper and hollow lower tubular sections of the side rails of the left and right side rails and the aft ends thereof. These rail ends may be attached to the side rails, for example, by metal inserts engaging the upper and lower tubular sections of the aft ends of each side rail in combination with an end rail bracket and machine screws. Such rail ends may also be utilized to the join the upper and lower hollow tubular sections of the side rails at the right and left fore ends.

Figure 3C:
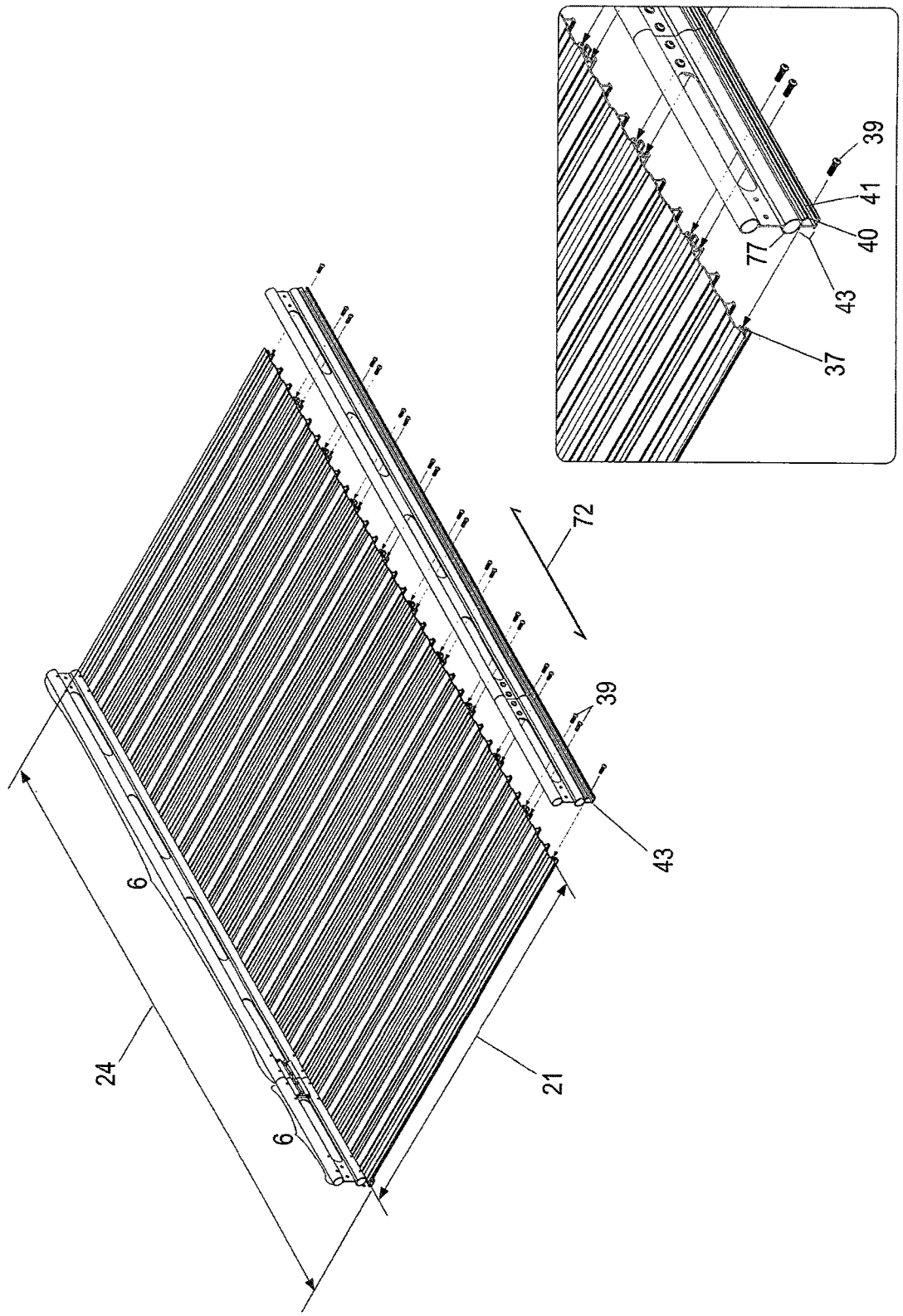
Figure 4:
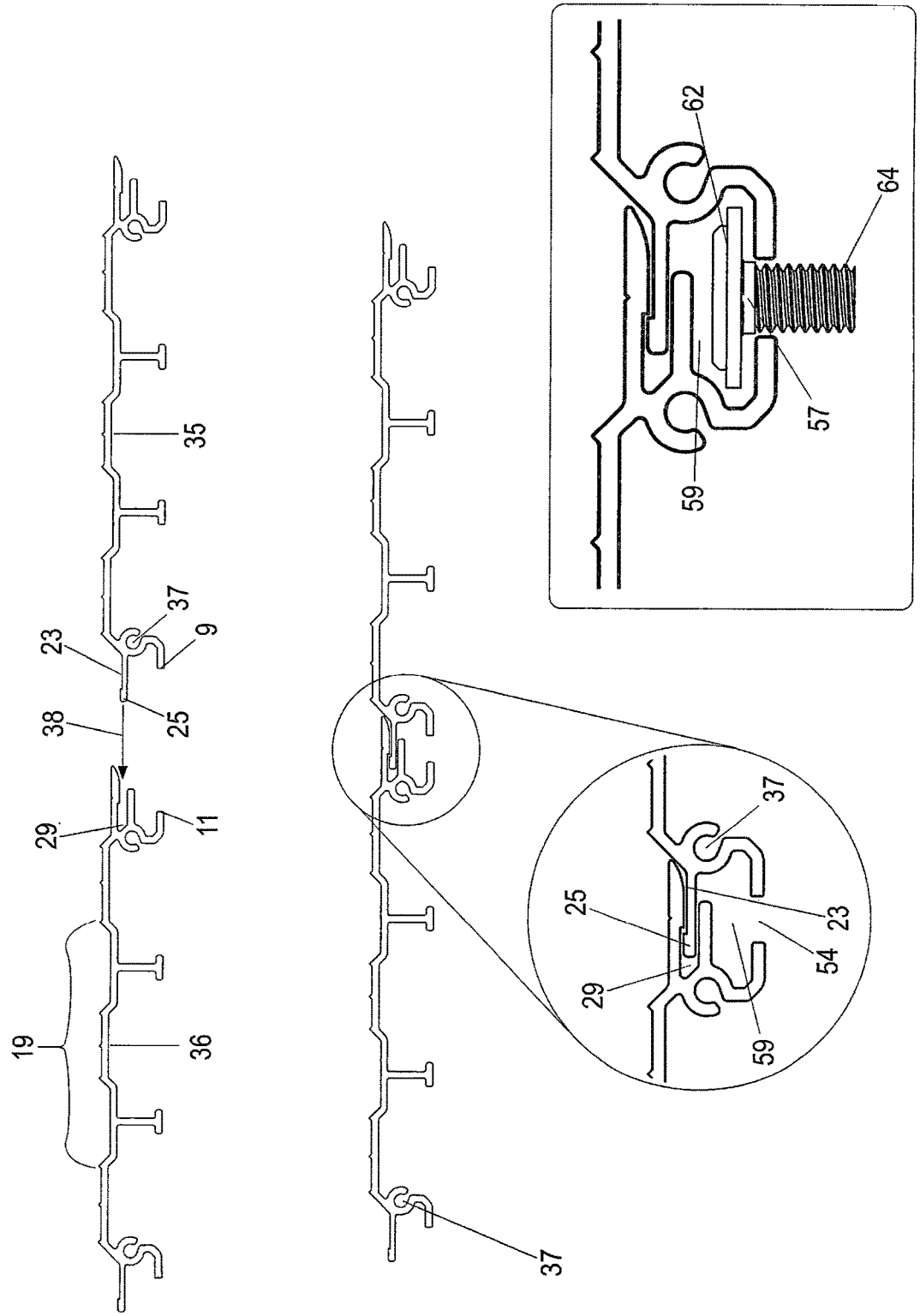
FIG. 4 is a side view of two panels utilized in the assembly of a preferred embodiments of the present invention before and after joining thereof as well as an enlarged section view.

The panel segments which are joined to form a fully assembled panel are designed and configured to enable rapid and efficient attachment of the platform to the right and left platform mounting rail as well as simplified affixation of the platform to the left and right side rails. As illustrated in FIGS. 3a, 3b, and 3c, the individual panel segments, or, as referred to herein with equal meaning "panels", present a right end 5, a left end 7, a fore end 9, an aft end 11 as well as a bottom 15 and top surface 17. The top surface, which is oriented and positioned so as to lie essentially parallel to a roof upon which the platform is mounted, is also the surface which comes into contact and supports cargo. The length of each panel 22 is defined as the distance between the right and left end thereof. The width 20 of each panel is the distance between the fore and aft end of each panel. As illustrated in FIG. 4, the top surface is advantageously formed in a corrugated pattern of ridges and groove pattern 19. Such form and shaping substantially increases friction provided by a fully assembled platform and thus reducing sliding and/or shifting of cargo (as well as the slipping of individuals) set thereupon.

As illustrated in detail within FIG. 4 the fore 9 and aft 11 ends of the panel members are especially designed, configured and formed to enable swift and convenient affixation of one panel to an adjacent panel at the fore and aft ends thereof. In preferred embodiments of the present invention, each panel is configured so dimensioned so as to span the entire width 21 of the platform to be assembled (as discussed in more detail, below). For the purpose of swift and convenient platform assembly, in preferred embodiments of the present invention, each panel includes, on the fore end 9, a locking extension arm 23 with a barb 25 located at the distal end of the extension arm running the entire the length thereof 22, from the right to left end of each panel, as shown in FIGS. 3b and 3c. The aft end 11 of panels utilized in such embodiments includes a corresponding locking extension receiving groove 29 also running the entire length of the aft end of such panels from the right to left end thereof. The locking extension arm and receiving groove are located and positioned parallel to the top and bottom surfaces of the panels so as to allow interlocking thereof when each panel lies on substantially the same substantially flat plane. By the term "substantially same flat plane, the horizontal plane upon which the lower surface of each panel lies should not deviate more than 10 degrees and, ideally, the panels should be aligned, during assembly, so that the lower surfaces of each panel being joined should lie on the same horizontal plane. Therefore, when two panels are positioned so that they lie adjacent to one another on a substantially flat plane with the fore end 9 of a first panel 35 aligned with and adjacent to the aft end 11 of a second panel 36 compressing the panels together as shown by arrow 38 will cause the locking extension arm extending from the fore end of the first panel to be fully insert and lock into place within the extension receiving groove of the second panel thereby firmly locking the panels together. The panels are thus joined along their entire fore and aft surfaces without need for external hardware, complex twisting or otherwise further manipulating such panels. The panels may be initially aligned and partially joined by simply pushing the panels together and thereafter using, for example a rubber mallet to fully join them. This snap fit system greatly increases the ease and speed of assembling a panel directly upon a vehicle roof or by pre-assembling the panel on any relatively flat surface (including the surface of a vehicle roof). Conversely, the panels may also be formed so that the locking extension arm is formed on the aft end of each panel whereas the extension receiving groove is located on the fore end. It is preferred that the panels be formed of a strong, weight bearing material such as a metal or polymer. Metals such as galvanized steel, stainless steel, and aluminum alloys may be selected for the fabrication of panels. Plastic polymers such as polycarbonate, polyethylene, polyvinylchloride and fiber reinforced plastic.

As illustrated in FIGS. 3a, 3b, and 3c, both the left and the right ends of each panel segment include assembly screw receiving apertures 37 which, as described in detail below, enable assembly screws 39, passed through corresponding assembly bores 41 formed in the "C" shaped channel portion 43 of the left and right side rail to engage and affix each side panel member to the left and right side rails. In preferred embodiments of the present invention, the panels are formed in the shape of a rectangle when viewed from the top or bottom surface. As shown in FIG. 3b, the distance between right and left ends of each panel may be described as the panel's length 22. Each modular vehicular roof platform is assembled from a kit intended to create a fully assembled platform of a specific width 21 and so each such kit will have panels all demonstrating a uniform length 22 which will result in an assembled platform of a desired width 21. The width 20 of all panels utilized in assembling a given platform (the distance from the fore to aft end of each panel) are, preferably, equal to one another. The overall length 24 of a platform assembled from such panels, will equal the sum of the individual widths 20 of each panel utilized in assembly of the platform.

Figure 10:
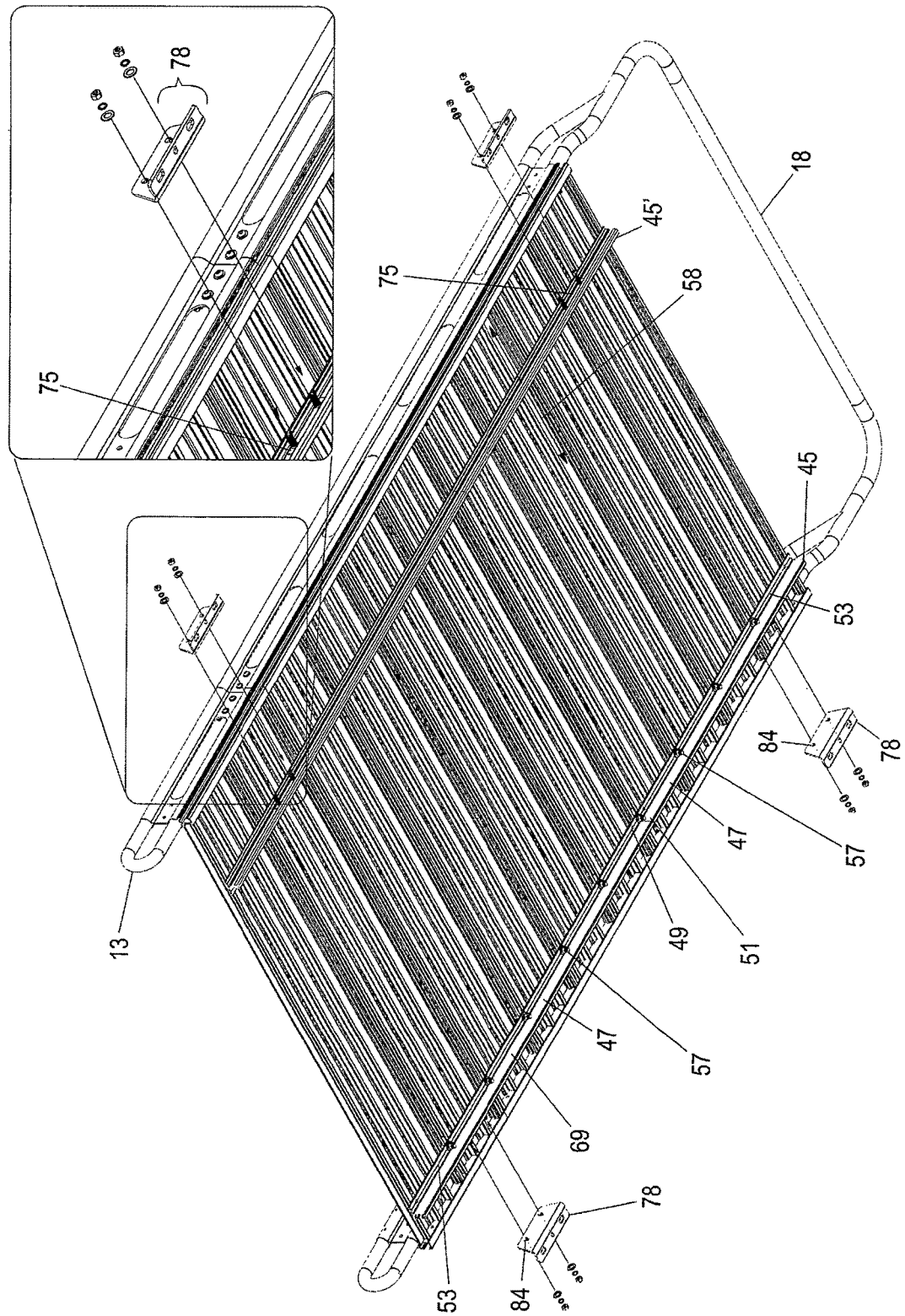
FIG. 10 is a bottom right isometric view of a partially assembled preferred embodiment of the modular vehicular roof top cargo platform of the present invention included an exploded view of roof mounting brackets incorporated therein.

As illustrated in FIG. 10, the modular vehicular roof top platform of the present invention includes a left and a right platform mounting rail 45/45'. Preferred embodiments utilize separate platform mounting rails (in relation to side rails) in order to affix the platform to a vehicle, as opposed to utilizing the side rails to do so. Such a configuration expands the possibilities of platform width beyond the width between right and left, (most often, longitudinally aligned), roof mounting features such as flanges, grooves or a longitudinally arranges series of bores and/or tabs all of which are linearly arranged and ordinarily located adjacent the left and right boundaries of a vehicle roof.

The left and right platform mounting rails, in turn, are assembled from platform rail segments 47 as shown in FIG. 7-10 which, as discussed in more detail below, are affixed to one another so that the fore end of one segment 49 is attached to the aft end 51 of an adjacent segment. Platform rail segments are provided in a plurality of lengths in order to enable the production of a fully assembled platform mounting rail of a desired fore/aft length which corresponds to the desired fore/aft length of a fully assembled platform. FIGS. 7a and 7b illustrate the assembly of a portion of a platform mounting rail from two segments 47. As shown in the figures, the two segments are affixed adjacent to one another by means of flange bolts 57 captured within the flange bolt receiving channels formed at the junction of two panels, attaching such adjacent segment to both the panels as well as each other. In some preferred embodiment, a semicircular bore formed through the top flange of adjacent platform mounting rail segments 162 at the fore and aft ends thereof, forms a complete bore through which a flange bolt passes and which affixes the proximal ends of such rail segments to one another upon the placement of a washer 160, lock washer 153 and tightening of a nut 155 upon said flange bolt.

The left and right platform mounting rails and individual platform mounting rail segments (from which they are assembled) are configured as elongated bars having a top flange section 53 that include assembly bores 55 for receipt of bolts, such as, for example, flange bolts 57 which extend downward from the platform. (See FIG. 8) More specifically, upon affixation of the fore and aft ends of panels to one another (as discussed above), a flange bolt receiving channel 59 (see FIG. 4 and FIG. 11) is formed at the intersection of the panels just below the locking extension arm and the receiving groove. The flange bolt receiving channel formed between adjacent panels runs the entire right to left end (the entire length) of each panel and includes a continuous slot 54 along the bottom surface of the channel. The slot is of a lesser width than that of the flange bolt receiving channel above so that the flange bolt 57, can be inserted into the receiving channel with the head section 62 of the flange bolt being contained within the channel while the threaded portion 64 of the bolt extends downward through the slot 54 located directly below. The threaded portion of the flange bolt is then inserted through the assembly bores 55 formed upon the top flange of the platform mounting bar. As mentioned above, in certain preferred embodiments, such assembly bores are formed from two semi-circular bores formed at the fore and aft end of each panel mounting rail so as to form a circular assembly bore at the junction of the fore and aft rail segments. At this location, the flange bolt not only affixes the panel mounting rail to the panels but also affixes adjacent rail segment to one another. Prior to fully tightening the flange bolts, they are able to slide back and forth in an inboard and outboard manner within the flange bolt channel. This movement, in turn, enables the platform mounting rail, attached to the panels via the flange bolt, to be positioned in a right to left (or inboard/outboard direction) 58 as illustrated in FIG. 7. This movement allows the platform mounting rail to easily and quickly be moved into a position proximate to roof mounting features. This movement enables roof brackets, which are affixed to the platform mounting rail along the fore/aft length thereof, (discussed, below) to be positioned in a correct inboard/outboard position so as to enable affixation of the brackets to vehicular roof mounting features. It also enables the platform to be centered in relation to the longitudinal center line of a vehicles roof—centered in regard to the left/right position of the platform—. After the platform mounting rails have been so positioned, tightening of, for example, a washer 61, lock washer 63 and nut 65 which have been placed upon the threaded portion of a flange bolt passing downward from the panel through the assembly bore (located on the top flange section of the mounting rail), firmly fixes the mounting rail in that correct position (see FIGS. 4-8).

Figure 5:
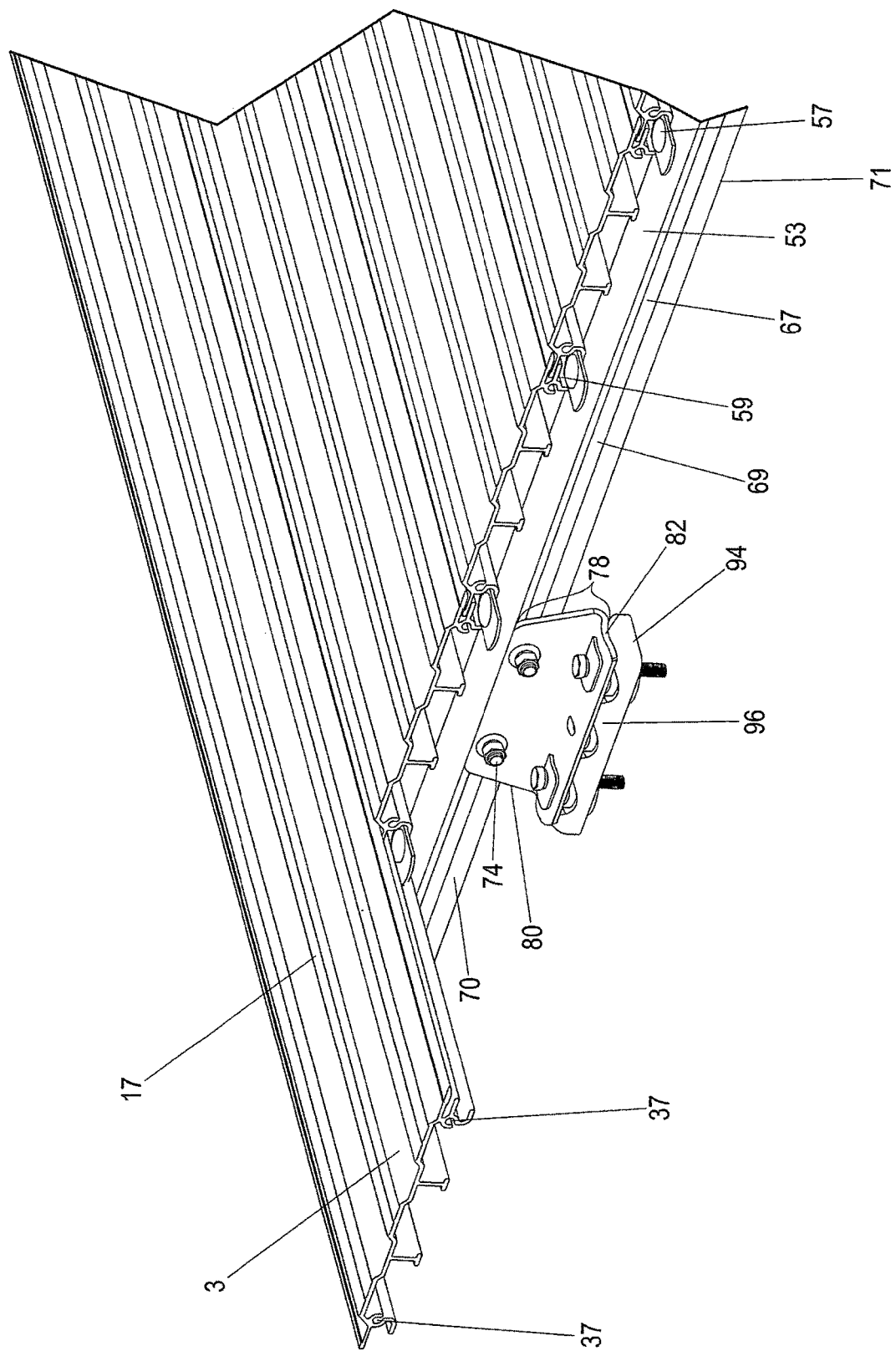
FIG. 5 is a top right isometric view of a partially assembled platform of a preferred embodiment of the present invention.
Figure 6:
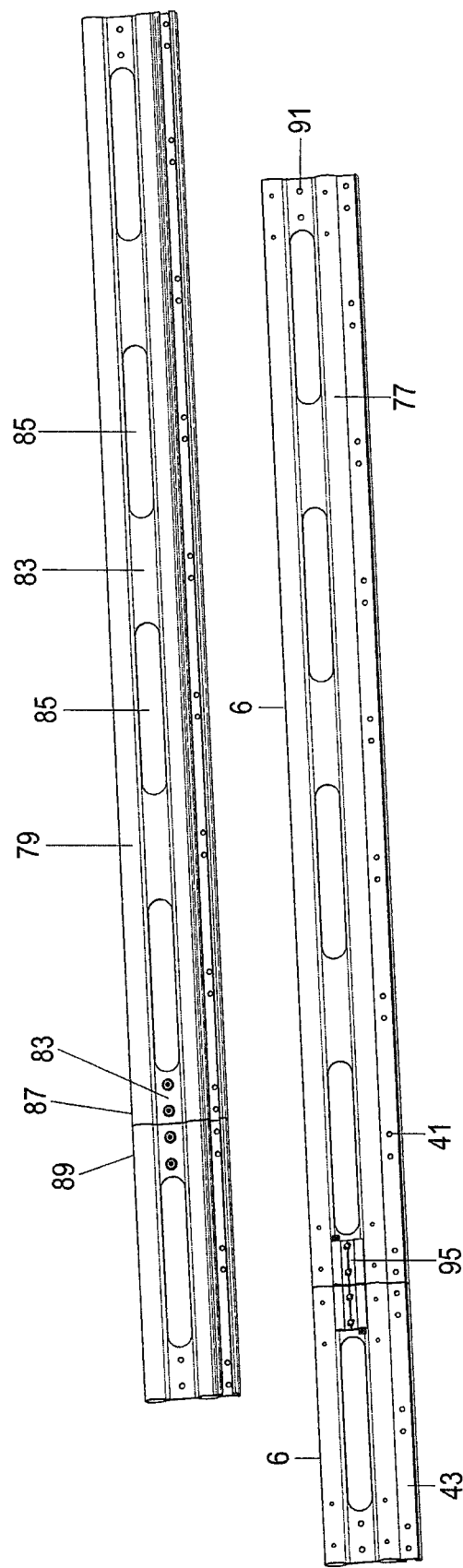
FIG. 6 is a side view of a partially assembled side rail utilized in a preferred embodiment of the present invention.
Figure 7B:
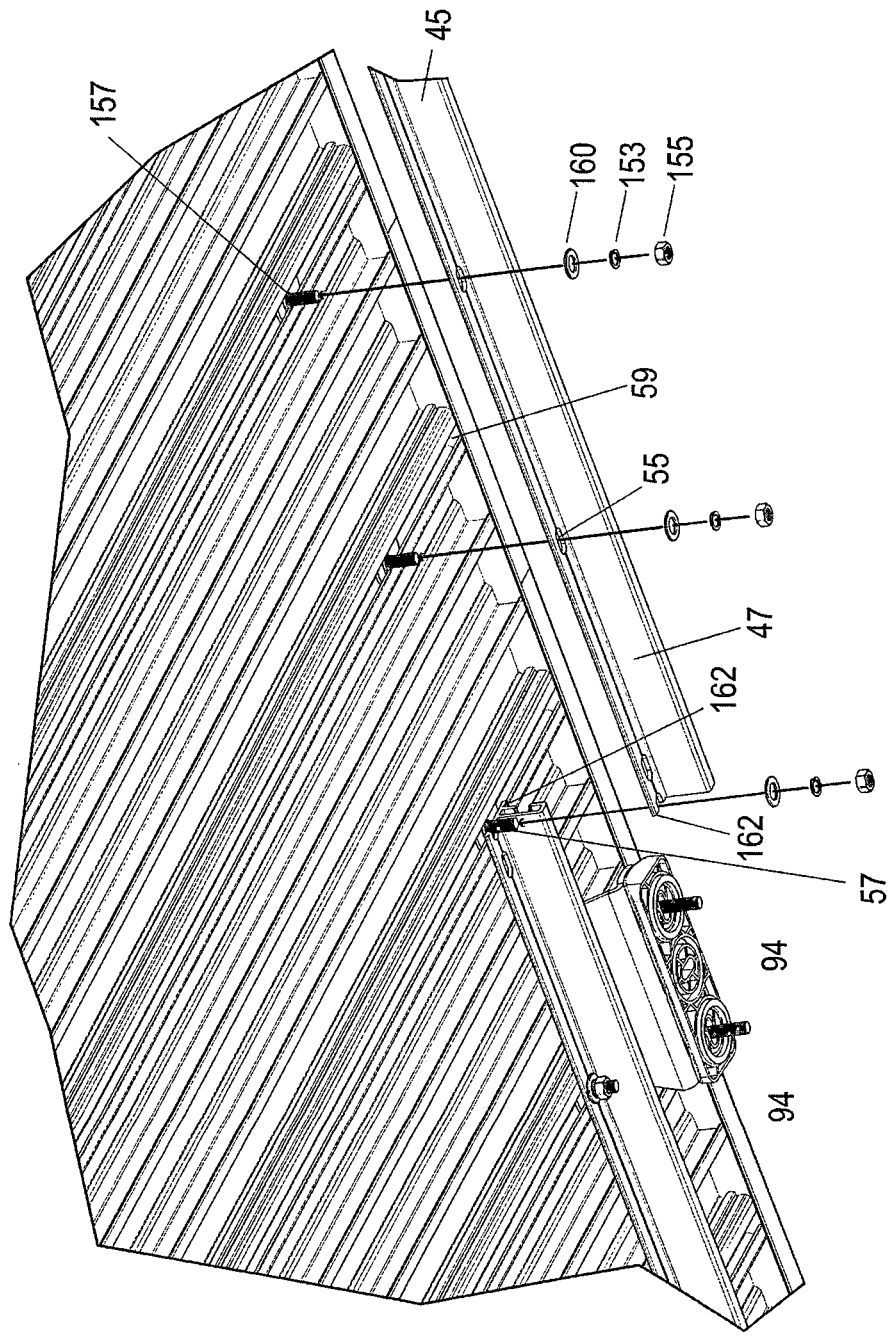
FIG. 7b is a bottom isometric sectional view of a preferred embodiment of the present invention illustrating an exploded detail view of panel mounting rail segment assembly.
Figure 11:
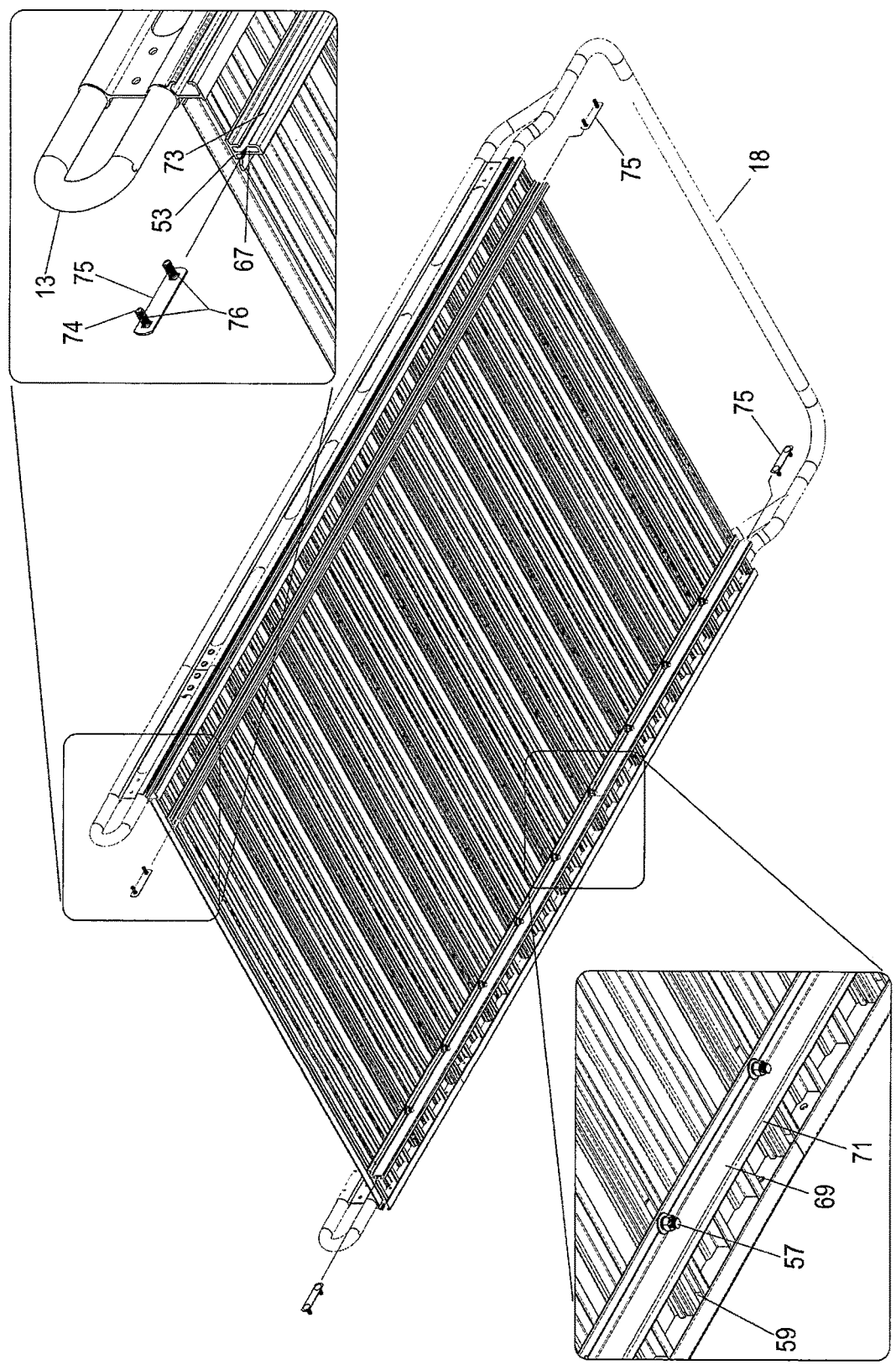
FIG. 11 is a bottom right isometric sectional view of a partially assembled preferred embodiment of the modular vehicular roof top cargo platform of the present invention further illustrating an exploded view of the attachment of a preferred platform mounting rail and flange bolt assembly.
Figure 12:
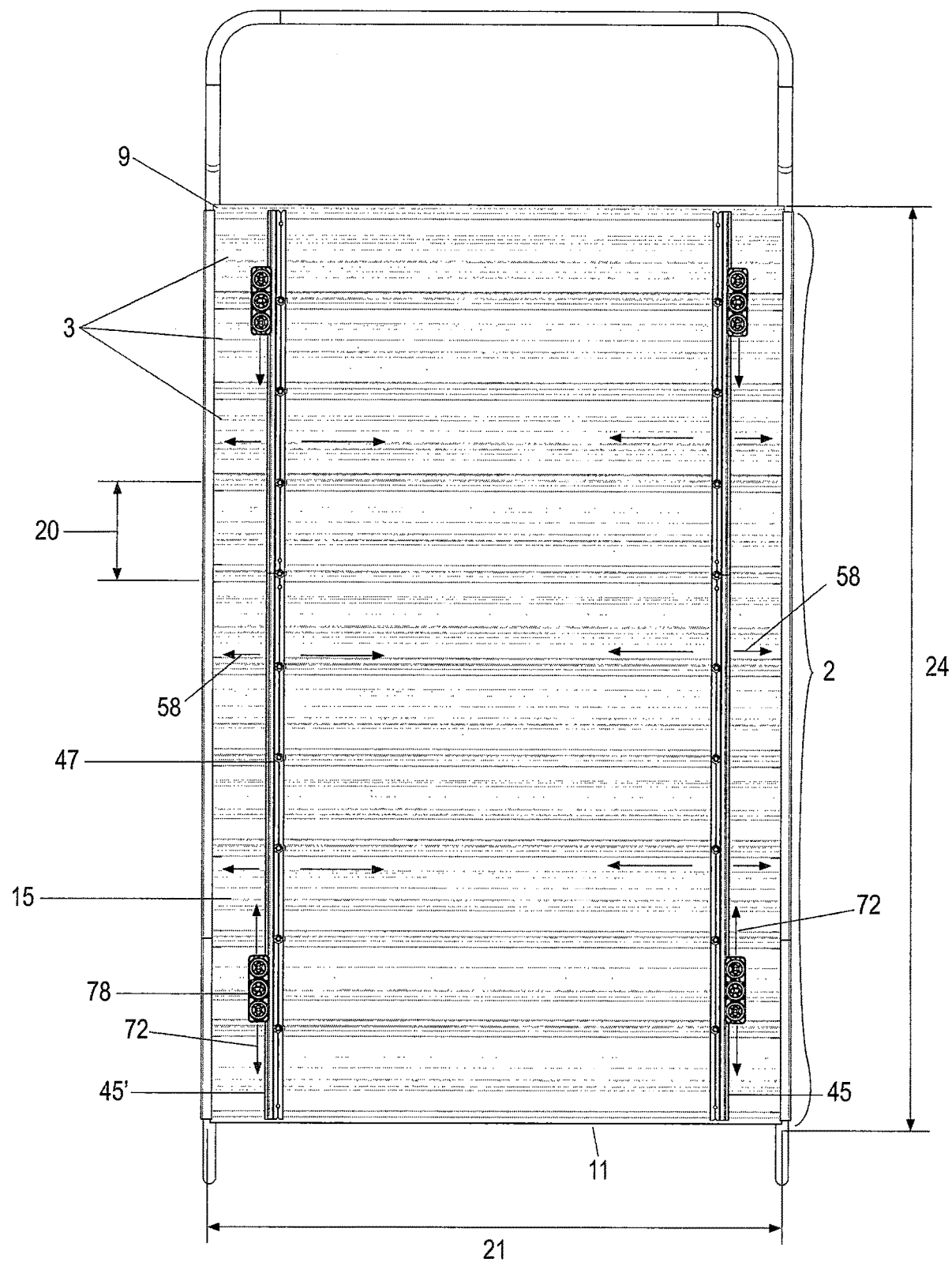
FIG. 12 is a bottom view of a preferred embodiment of the modular vehicular roof top cargo platform of the present invention.
Figure 16:
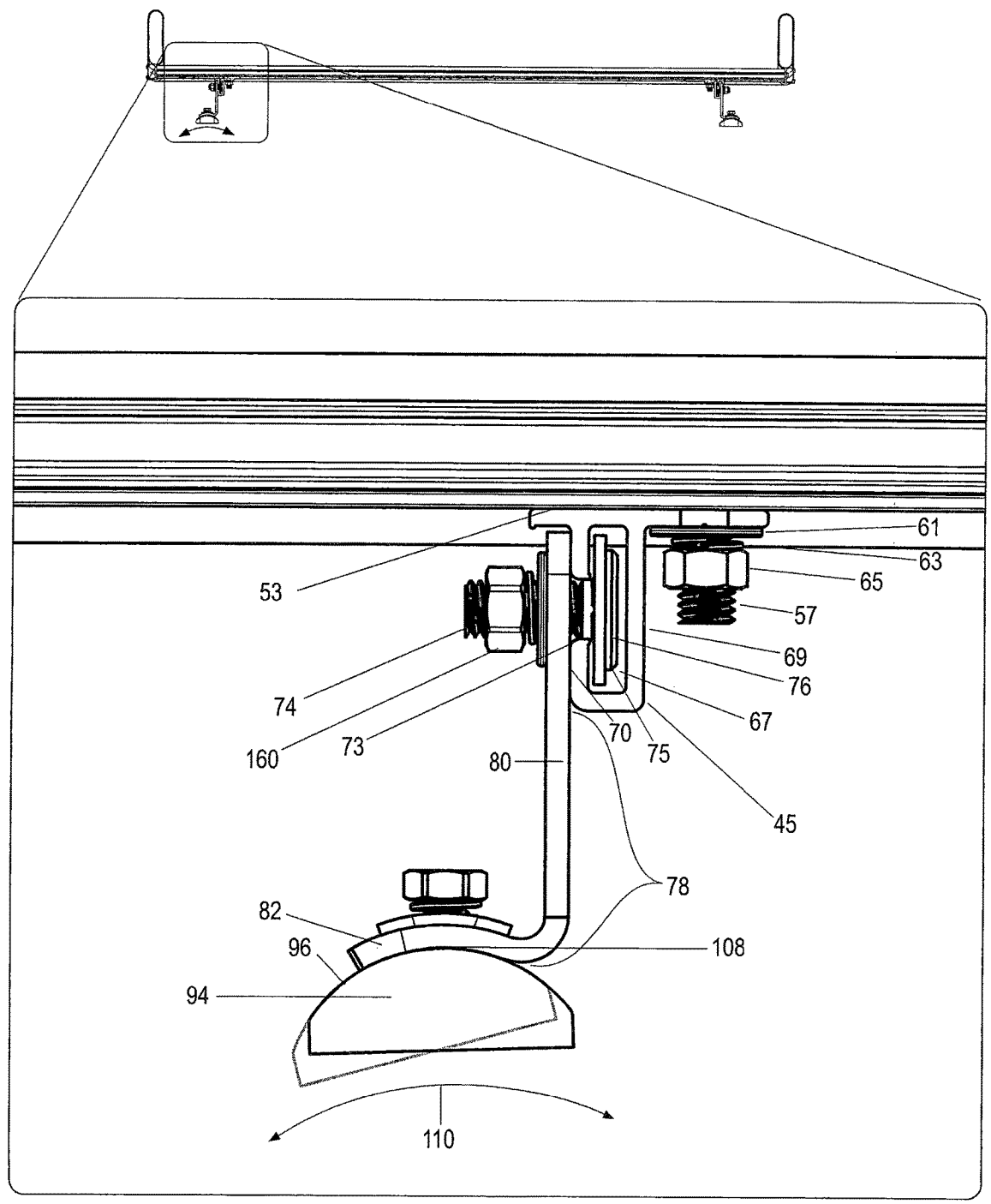
FIG. 16 is a front view of a preferred embodiment of a vehicular roof top cargo platform of the present invention with enlarged sectional detail view of a preferred roof bracket.

As shown in FIGS. 5 and 7*a*, the platform mounting rail, at the outboard portion thereof, includes therewithin a sliding flange bolt assembly channel 67 which is open at the fore and aft terminus thereof in order to allow insertion of the sliding flange bolt assembly. The channel is closed on the top flange section 53, the inboard section 69, and the bottom section 71. The sliding flange bolt assembly channel is especially shaped, formed and configured to enable placement therein of sliding flange bolt assembly 75 as shown in FIGS. 11 and 16. The sliding flange bolt assembly channel therefore enables the placement and slideable retention therein of the sliding bolt assembly while the slot is sized and configured to enable one or more bolts 76 extending therefrom to pass there through in an outboard direction, as described in more detail, below. It is preferred that the platform mounting rail be fabricated from a metal such as a steel or aluminum alloy. The platform mounting rail can also be formed from a polycarbonate, polyvinylchloride, polyethylene or fiber reinforced plastic. In the same manner as the side rail segments of the present invention are provided in a plurality of lengths, the platform mounting rail segments are also provided in a varying lengths so as to enable the production of a fully assembled platform rail demonstrating a desired length. It is preferred that the left and right platform mounting rail demonstrate a length equal to that of the left and right side rail—but not including the additional length provided by end rails and/or accessory bars—.

A platform, mounted upon the platform mounting rails, in accordance with the present invention, is affixed to a vehicle roof as follows. Sliding flange bolt assemblies 75, such as dual bolt sliding flange bolt assemblies illustrated within FIGS. 11 and 16, are so shaped and configured that they can be introduced and oriented so that the threaded ends 74 of the bolts 76 therein extend through the channel access slot 73. The sliding flange bolt assembly channel, which runs the entire fore-aft length of the platform mounting rail is so configured and dimensioned so as to enable placement therein of the flange section of the assembly. The channel access slot 73, of lesser dimension, also running along the entire length of the rail, enables the threaded ends 74 of the flange bolt assemblies to extend outboard therefrom. More specifically, once placed within the channel, the channel slot enables the flange bolts to slide along the channel, in a fore/aft manner, but not to pass through the slot. The threaded portion of the flange bolt assemblies, are positioned so as to enable affixation thereof to roof mounting brackets 78 utilized to affix the platform mounting rails to a vehicle roof, discussed in more detail, below. (See FIGS. 16 and 17)

Unlike roof top platforms of the prior art, the left and right side rails 4/4' of the present invention are not used for attachment of the platform to a vehicle roof. They are utilized in combination with the locking extension arms and locking extension receiving grooves as an additional means of affixing each of the individual panels to one another to form a complete platform. The side rails also provide for greater rigidity of the assembled platform and to increase rigidity and resistance to deformation. In addition, the side rails of the present invention provide a left and right perimeter end wall for the platform. While the locking extension arm 23 and locking extension receiving grooves 29 formed along the entire fore and aft side of each panel attach these panels at the fore/aft intersection thereof, the side rails, utilizing assembly screw receiving apertures 37 formed along the left and right end of each panel, provide affixation points at the left and right ends of each panel, via the side rail. The left and right side rails also demarcate the left to right dimension of the platform. Just as the number and width of panels are selected to obtain a desired platform length, the length of the panels included in each application determine the width of the fully assembled platform. Since the attachment features of each panels of the locking extension arm, the locking extension arm receiving groove and the assembly screw receiving apertures run along the entire length of each panel, panels may be cut into virtually any desired length for a given roof application and still retain the attachment features.

As illustrated within FIGS. 13*a*, 13*b*, 14 and 15 the left and right side rails are assembled from side rail segments 6. The side rail segments are provided in a plurality of lengths so as to enable assembly of fully assembled left and right side rails demonstrating a desired fore/aft length required and applicable to a particular vehicle's roof dimension or desired roof coverage. In preferred embodiments of the present invention, side rail segments are especially shaped and configured to provide superior strength and rigidity as well as providing enhanced strength upon assembly of such side rails segments into fully assembled left and right side rails. More specifically, the segments are advantageously shaped and configured as two vertically aligned round hollow tubes joined by an intermediary, vertically disposed flat attachment section, both hollow tubes and attachment section being positioned above an open "C" shaped channel section all discussed in more detail, below.

Figure 13A:
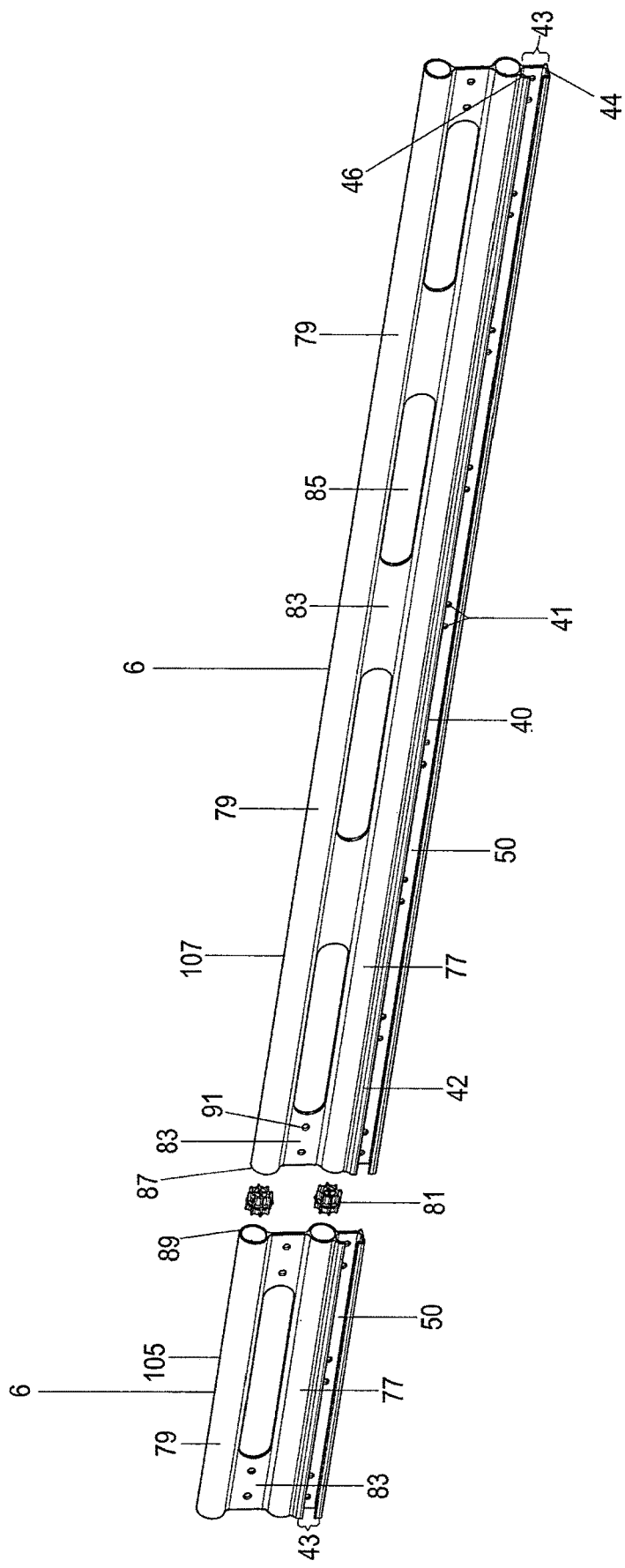
FIG. 13a is a top right isometric view of two side rail segments utilized in a preferred embodiment of the present invention with an exploded view of a portion of the assembly details of the side rail segments.

More specifically, (as illustrated in FIG. 13*a*) each side rail segment includes a lower "C" shaped open channel section 43 formed and shaped as an open tube having an inboard portion 40, and outboard portion 42, a lower portion 44 and an upper portion 46. The "C" shaped tube forms a channel running along the entire fore/aft length of each side rail segment as well as the full length 48 fully assembled left and right side rail. A slot 50 running along the entire outboard surface of the "C" shaped channel of each segment and, of course, each fully assembled side rail, provides access to the "C" shaped channel as well as the inboard surface portion thereof. In addition, this slot provides access to for introduction of assembly screws 39, or in other embodiments, assembly bolts, to assembly bores 41, formed through the inboard portion of the channel. The "C" channel assembly bores, in turn, provide access to panel assembly screw receiving apertures 37 formed in the left 7 and right 5 ends of the panels, as discussed above and below (see FIGS. 3*a*, 3*b*, and 3*c*). Threading panel assembly screws through said assembly bores in the "C" shaped channel and thereafter into the panel assembly receiving apertures formed within the right and left ends of each panel secures the individual panels to the right and left side rails segments (and the side rails they form). Thus affixing each panel to the side rails in this manner also affixes each individual panel to the remaining panels that are affixed in this way to the side rails A hollow lower tubular section 77 of the left 4 and right 4' side rails (and side rail segments) is formed, located, and positioned directly above the side rail "C" shaped open channel section 43. The round tubular configuration of this section, as well as the upper tubular section 79, discussed above, provides increased strength and rigidity to the side rails as compared to rails formed simply from angled bar stock. Both the hollow upper and lower tubular section are hollow and are especially configured to provide for secure receipt of a side rail segment joiner 81 such as, for example, a fluted plastic or metal insert (or as it may be referred to throughout the assembly and claims with equal meaning, an ("assembly bushing or assembly insert") discussed, below. The insert is utilized for assembling aligning the side rails from the side rail segments that form same.

Figure 13B:
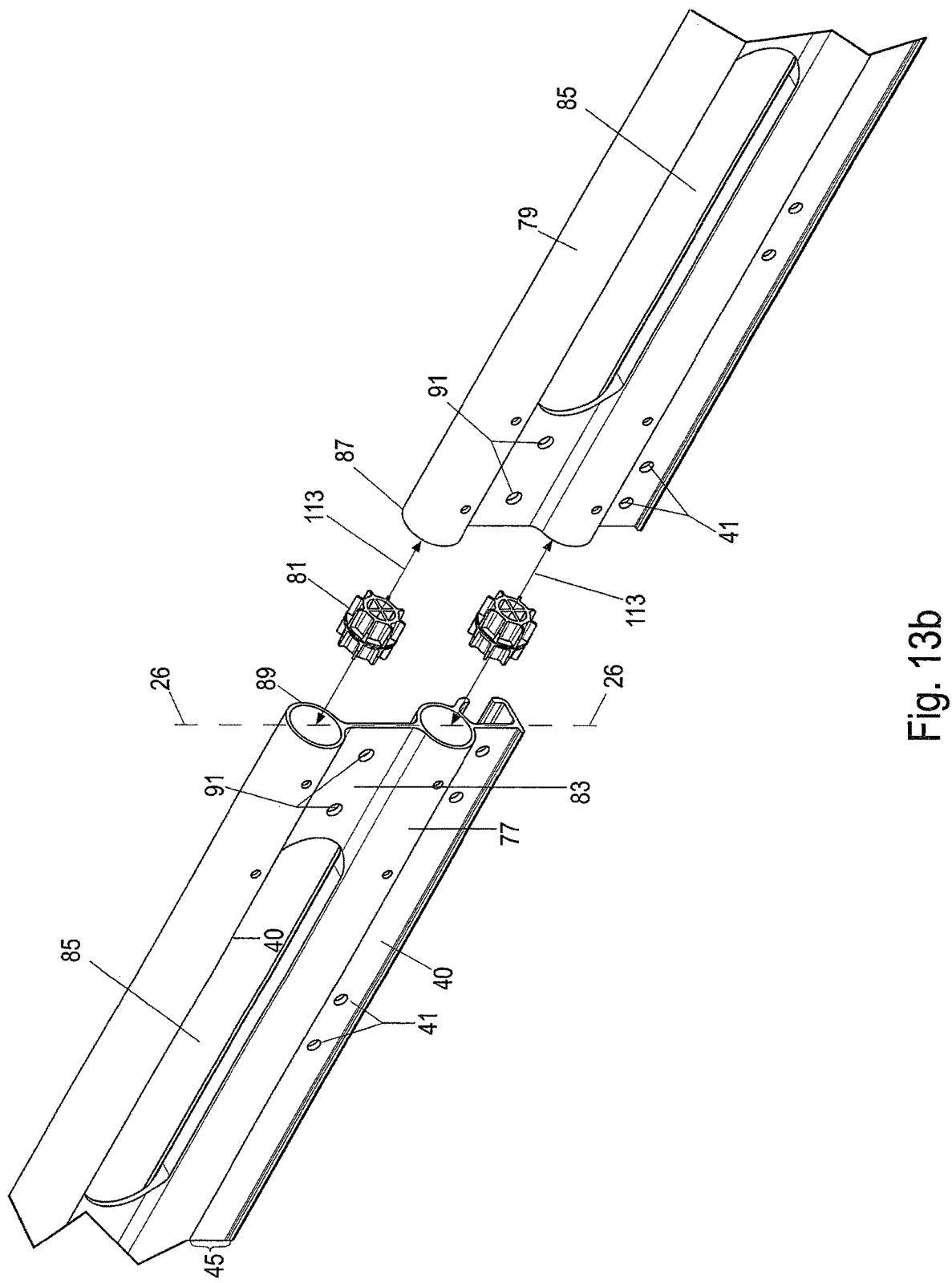
Figure 14:
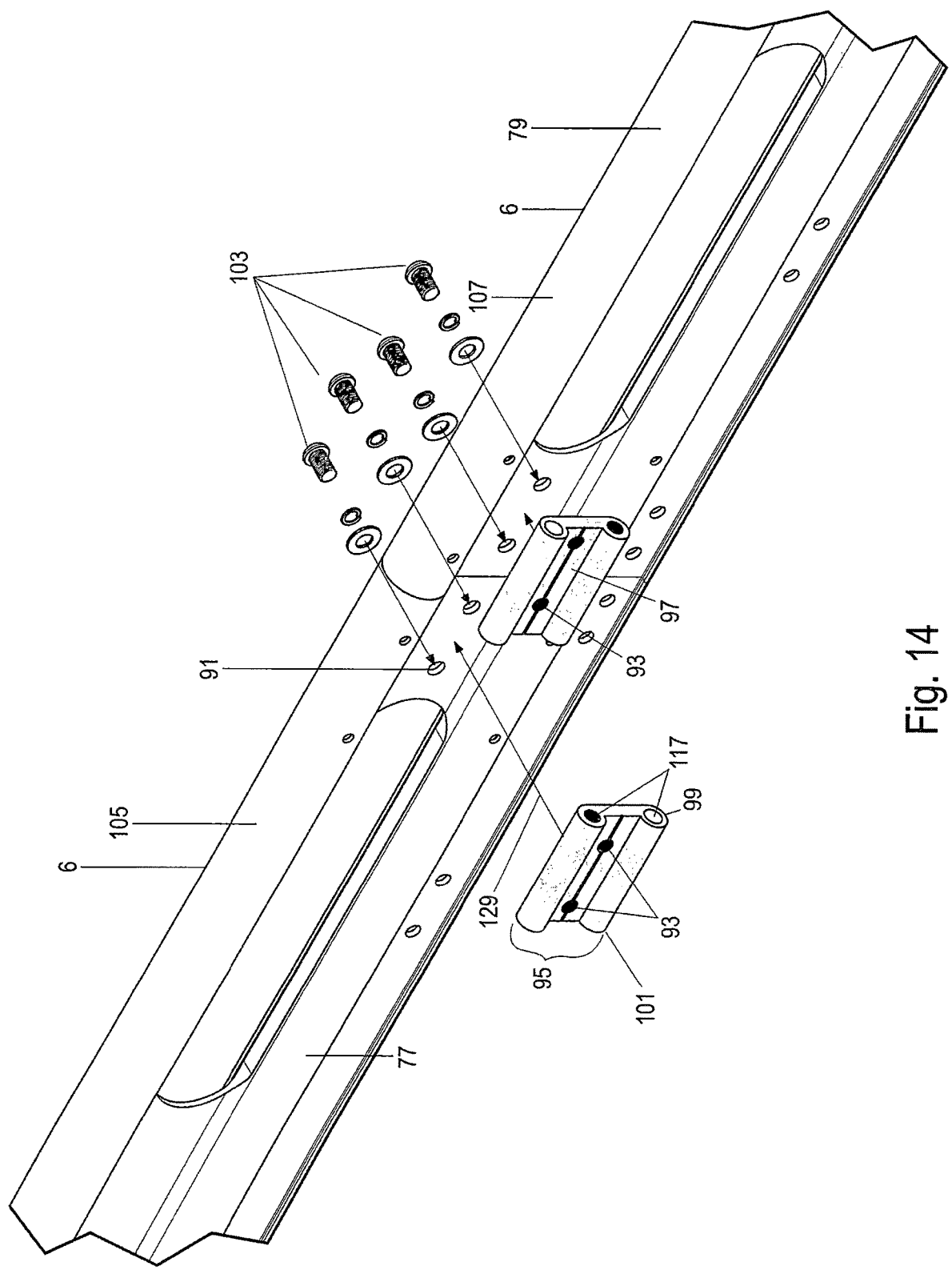
FIG. 14 is a top right isometric exploded sectional view of two adjacent side rail segments and segment attachment brackets utilized in preferred embodiments of the present invention.
Figure 15:
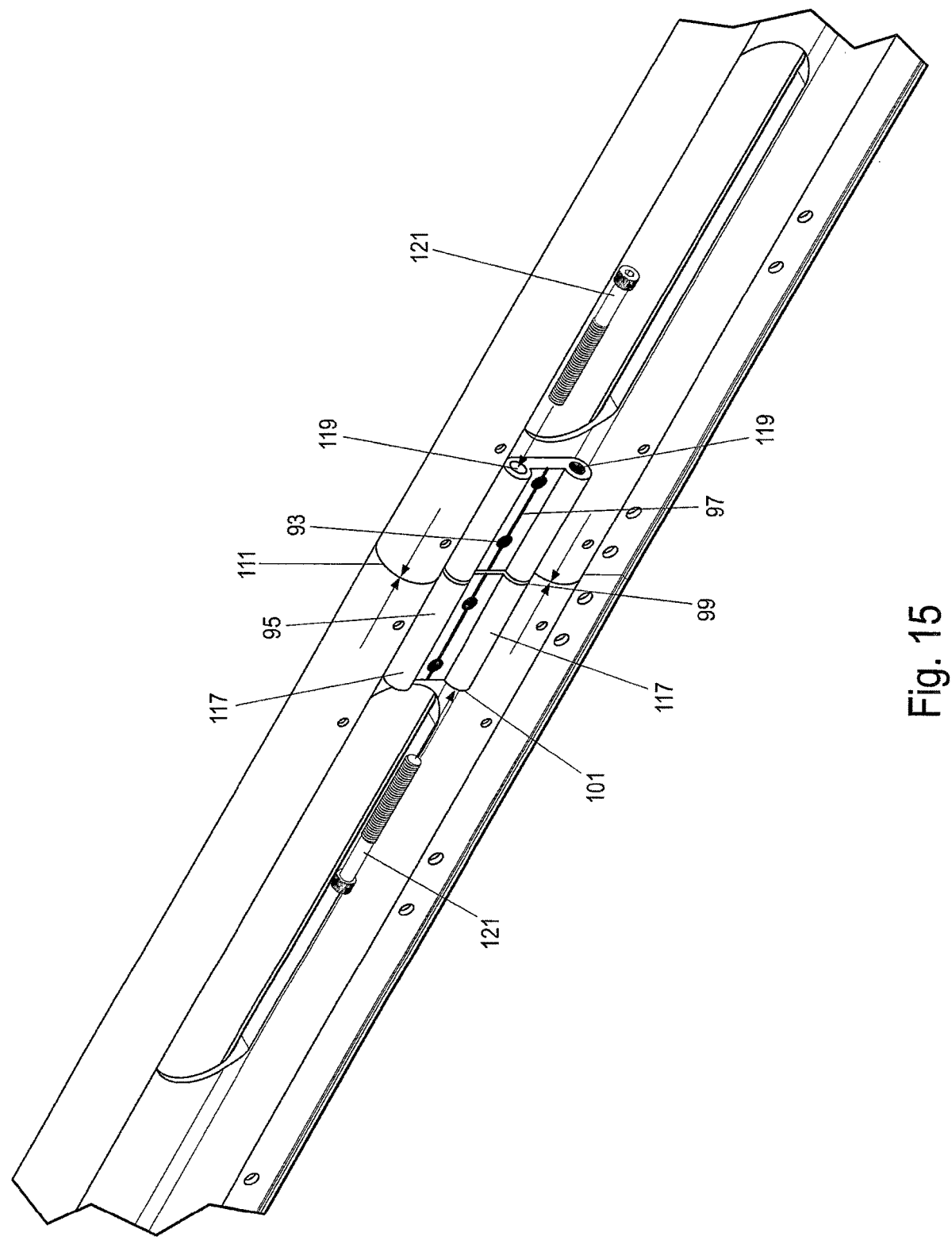
FIG. 15 is a top right sectional view of the two adjacent side rail segments shown in FIG. 14 with side rail segment brackets attached and machine screws utilized to attach adjacent brackets to one another in an exploded fashion.

As shown in detail in FIG. 13b, a side rail segment assembly section 83 is located between and joins the hollow lower 77 to hollow upper tubular sections 79 of each segment. The side rail assembly section is formed in a generally flat configuration running perpendicular to the plane of a vehicle roof upon which the side rail is positioned and is in longitudinal alignment with a vertical line 26 bisecting the upper and lower tubular sections. Thus the hollow upper tubular section, the side rail assembly section and hollow tubular section are longitudinally aligned. It is preferred that the side rail assembly section includes a plurality of large open slots 85 which provide a convenient point of attachment for tie downs, bungee cords and other cargo stabilizing devices. The fore 87 and aft 89 end of each side rail assembly section is provided with at least one, and preferably at least two assembly section bracket apertures 91 which may be configured as threaded or smooth bore apertures and which pass through the complete depth, or as it may also be described, the full thickness of the side rail assembly section. As illustrated in FIG. 14, the assembly segment bracket apertures are formed and positioned so as to align with at least one, and preferably two corresponding bracket attachment apertures 93 formed within segment assembly brackets 95 that are utilized to attach the assembly brackets directly adjacent to the outboard or inboard surface of the fore and aft ends of side rail segments. As illustrated in FIGS. 14 and 15, the bracket attachment apertures 93 formed within the segment assembly bracket are advantageously formed and positioned so as to pass completely through the central flat planar section 97 of the bracket proximal to the fore 99 and aft 101 ends of each bracket. They are so positioned in order to assure that, when affixing 129 the segment bracket to the fore 87 or aft 89 inboard or outboard surface of the side rail assembly section, the bracket will align with and lie flat against the planar surface of the assembly section of each segment as the bracket attachment apertures align with the assembly section bracket apertures 91. Such brackets are affixed to side rail segments, for example, by utilizing a machine screw 103 which, introduced through an assembly section bracket aperture 91 on, for example, the outboard surface of the assembly section of the side rail and thereafter passed through a bracket attachment apertures 93 of a bracket positioned on the inboard surface of the side rail segment. Placing, for example, a washer, lock washer on the machine screw 103 before introducing same into the assembly section bore located on the outboard side of the section will help assure that when the screw is threaded into the threaded bracket attachment apertures, a secure fixation will occur and be maintained. This same process is utilized, for example to affix a bracket to a fore and an aft bracket of a given side rail segment. Although it is preferred to mount the side rail segment attachment brackets on the inboard surface of the side rail segments (so as to present a smoother outboard surface), they are equally effective in affixing adjacent side rail segments to one another if affixed to the outboard surface.

It is preferred that, prior to affixing an assembly bracket to the aft end of a first side rail segment and a corresponding assembly bracket to the fore end of a second side rail segment, that the first and second side rail segments first be aligned and joined utilizing, for example, a plastic or metal insert or bushing 81, as discussed, above and illustrated in FIGS. 13a and 13b. As shown in these figures, a first side rail segment 105 and a second side rail segment 107 are first aligned and positioned so that the longitudinal axis of both the upper 79 and lower hollow 77 tubular sections of both segments are in alignment. Thereafter, for example, a metal or plastic assembly insert with for example, a bushing with tines 81, is inserted into both the upper and lower tubular segments at the aft end 89 of first segment 105 as well as the fore end 87 of the second side rail segment 107 as shown by insertion arrows 113. The tines advantageously increase friction between the insert and the inner walls of the hollow tubular section and thus help form a strong joint. More specifically, compressing the sections together, utilizing the assembly insert as an alignment guide, forms a tight butt joint 111, as illustrated in FIG. 15, joining and accurately aligning the two segments. Such alignment and positioned greatly aids the placement and affixation of assembly brackets 95.

As illustrated in FIGS. 14 and 15, the formation of such a but joint and the alignment provided thereby causes and positions horizontally disposed assembly channel 117 located at the upper portion and lower portion of the side rail segment assembly bracket 95 located at the aft end of the first side rail segment 105 to come into longitudinal alignment with the horizontally disposed assembly channels 119 located at the upper and lower portions of the side rail segment assembly bracket located at the fore end of the second side rail segment once said brackets are attached to the adjacent segments. Introduction of assembly bolts or machine screws 121 into the horizontally disposed assembly channels then firmly attaches the adjacent rail assembly brackets one to the other and, in turn, further affixes the first 105 and second 107 side rail segments firmly to one another by engaging threads formed within the assembly channels. It is preferred that the assembly bracket be formed of a metal such as a steel alloy or aluminum alloy.

Although the aforementioned segment assembly bracket is advantageously utilized in preferred embodiments of the present invention, other bracket configurations, well known to the art, may also be utilized for joining such segments. For example, segment assembly brackets which are formed, shaped and configured to overly and by affixed to both the fore and adjoining aft section of two segments may be utilized as a one piece bracket to so join such segments. In other embodiments, the fore and aft ends of each segment may incorporate, along the rail assembly section thereof, an interlocking connector comprised of a locking extension barb on the fore end of one segment, with a barb receiving channel formed within the aft end of an adjoining assembly segment.

Figure 8:
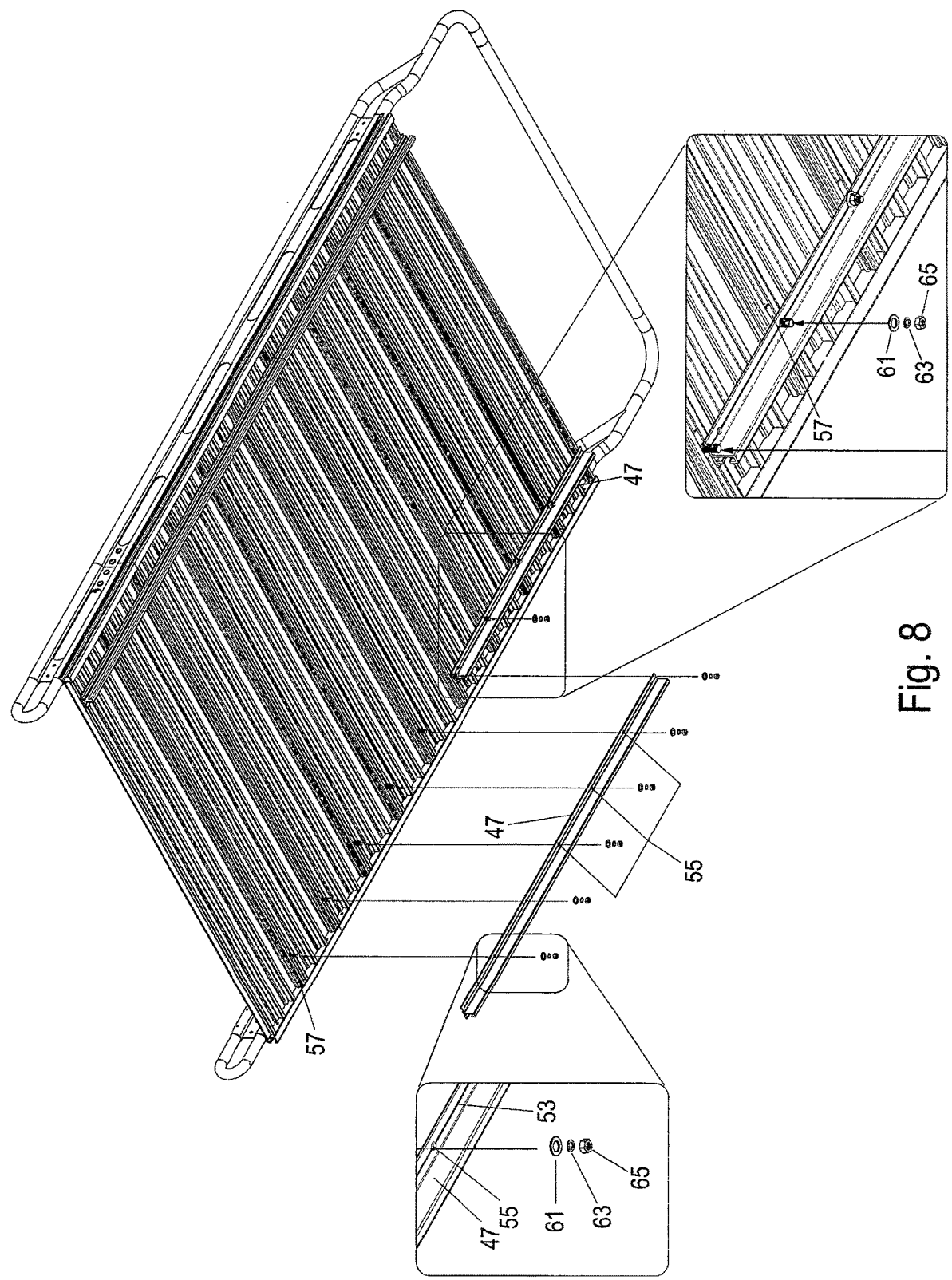
FIG. 8 is a bottom right isometric view of a partially assembled preferred embodiment of the modular vehicular roof top cargo platform of the present invention including an exploded and sectional view of a platform mounting rail incorporated therein.
Figure 9:
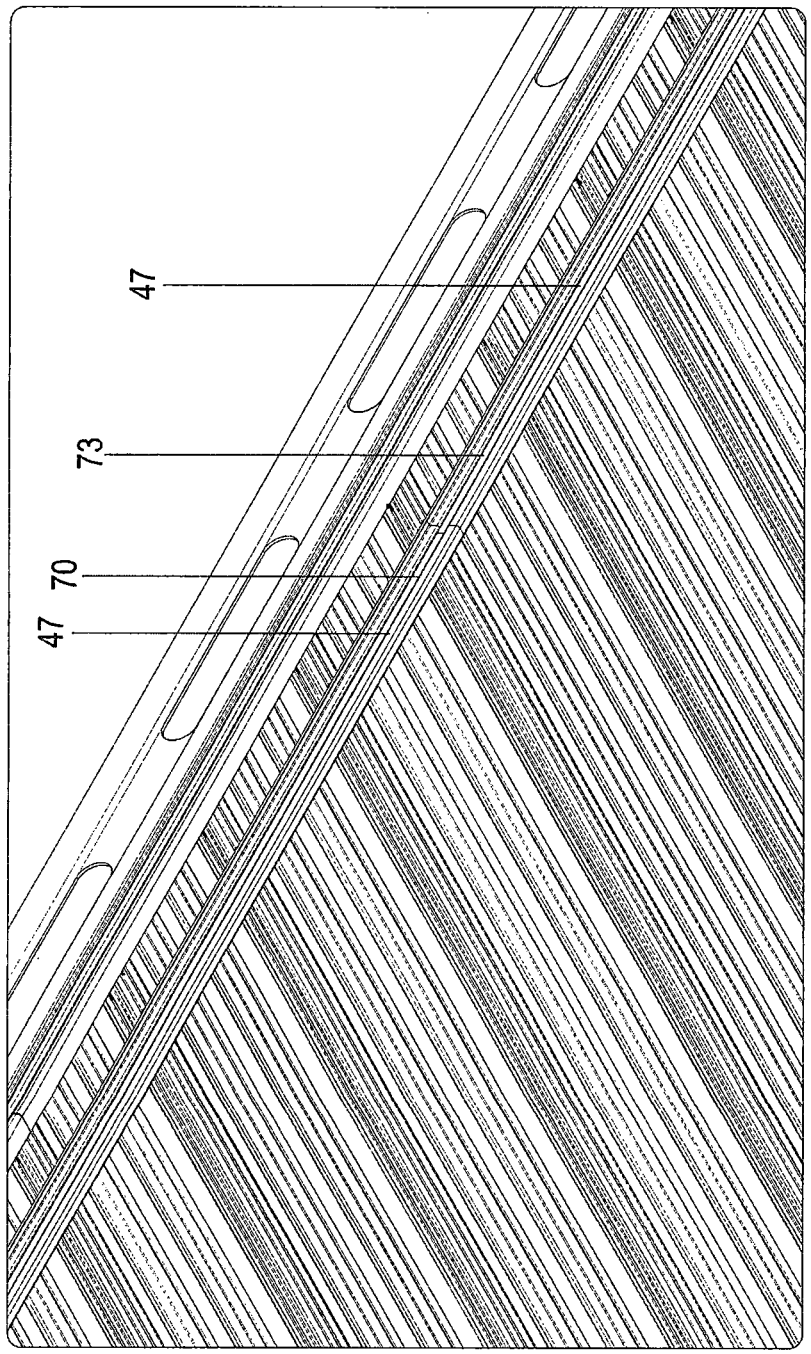
FIG. 9 is a sectional view of FIG. 8.

The right and left platform mounting rails 45/45' of the present invention are formed and shaped as elongated bars with a top flange section 53, an inboard section 69, an outboard section 70 and a bottom section 71. As mentioned above, the platform mounting rails are positioned inboard in relation to the left and right side rails to which the platform is attached. As shown in detail in FIGS. 5, 7a and 11, the platform mounting rails and platform rail segments have a sliding flange bolt assembly channel 67 located within the outboard portion thereof running the entire length of each rail segment and the fully assembled platform mounting rail they form. A channel access slot 73 located along the entire outboard surface of each platform mounting rail segment, leads to the sliding flange bolt assembly receiving channel, also running the entire length of the rail. As shown in FIG. 8, assembly bores 55 penetrating the top surface/flange 53 of the platform mounting rails are positioned and distanced apart along the length of the length of the top flange so as to enable alignment thereof with flange bolts 57 located within the flange bolt receiving channel. These bolts extend downward and pass through the assembly bores 55 during affixation of panels to the platform mounting rail. This arrangement enables the platform to be secured to the platform mounting rails.

As mentioned above, each platform mounting rail utilizes the flange bolt assembly receiving channel 67 and an outboard slot 73 leading thereto as an intermediate means of attaching the mounting rail to a vehicle roof. More specifically, and as illustrated in detail in FIG. 11, the sliding flange bolt assembly receiving channel and outboard slot leading thereto are especially shaped and formed to enable a sliding flange bolt assembly 75 to be introduced into the receiving channel 67 (through the fore or aft end thereof) in such a manner, orientation and position so that the threaded distal portion of each bolt 74 of said sliding bolt assembly extends outboard from the channel, while the proximal portion (or head portion) 76 of each bolt remains attached to the sliding assembly which, in turn, is captured within the central channel of the sliding flange bolt receiving channel. The sliding bolt assembly itself remains captured within the sliding flange bolt assembly channel wherein the assembly is able to slide in a fore and aft direction within the channel for alignment purposes. Such movement is enabled until, as described below, the assembly is affixed in its fore/aft position by tightening a nut 160 placed about the threaded portion 74 of the bolts, extending outboard from the assembly through the channel access slot 73. (See FIG. 16). Such tightening is accomplished only when the flange bolt assembly is in a fore/aft position enabling a roof bracket attached thereto to engage a roof feature (such as a threaded bore, bolt, or channel extending from the vehicle roof. It is preferred that each sliding flange bolt assembly to include two or more bolts oriented as described above and within the figures.

Figure 17:
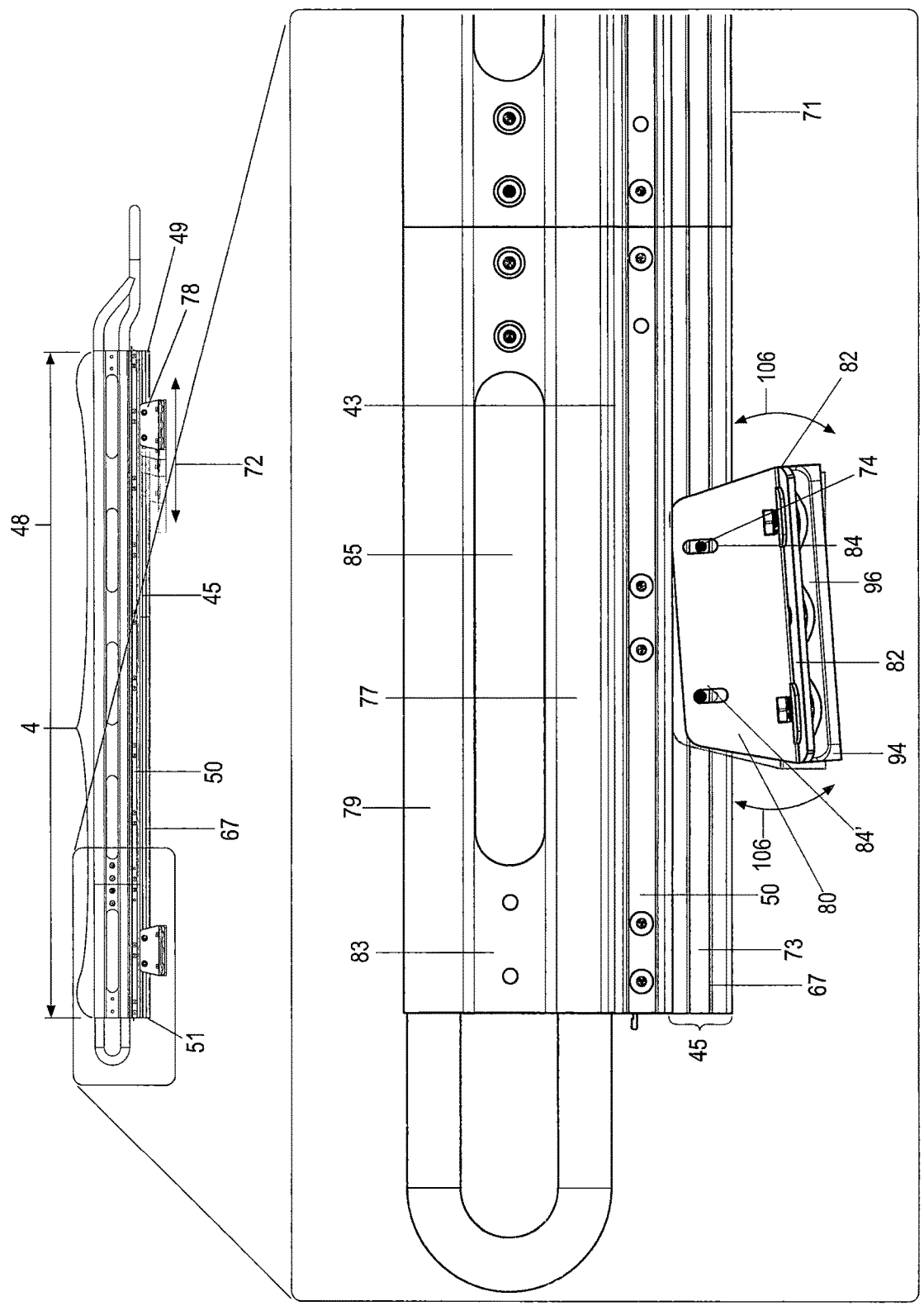
FIG. 17 is a right side view of a preferred embodiment of a vehicular roof top cargo platform of the present invention with enlarged sectional detail view of a preferred roof bracket.

In embodiments of the present invention wherein the sliding flange bolt assemblies incorporate two or more bolts, the distal threaded end 74 of such bolts are located, formed and positioned so they extend outboard from through the sliding flange bolt assembly channel 67 and slot 73 and are received by apertures formed in an upper section 80 of a roof mount bracket 78. As illustrated in FIGS. 16 and 17, the upper section of the roof mount bracket is generally planar and extends orthogonally upward from a lower portion 82 of the bracket. The apertures 84 formed within the upper section of the roof mount bracket are advantageously formed as slots, rather than a simple circular bores. The slot-like shape of the apertures 84 are oriented as vertically disposed slots. In this way, as discussed above and below, the angle 106 of the bracket may be adjusted in accordance with varying vehicle roof contours especially in regard to fore/aft slope. As illustrated in FIG. 17, the apertures 84 formed within the upper section of the roof mount bracket are advantageously configured shaped and formed as slots running perpendicular to the long axis of the upper section 80 of the roof bracket and vehicle roof upon which it is mounted. In this way, as discussed above and below, the angle 106 of the bracket may be adjusted in regard to fore/aft position in instances wherein the roof feature, to which the bracket is attached, is located on portion of a vehicle roof which, rather than being substantially parallel to the horizontal plane of the roof, includes a fore/aft cant.

The lower section 82 of the roof mount bracket, in certain preferred embodiments, defines a curve having a radius of curvature of from about 22 to about 33 millimeters, and, more preferably, from about 24 to about 31 millimeters, and still further preferred, to have a radius of curvature of about 27.5 millimeters (wherein the upper surface of the top surface of the lower section is convex and the bottom surface 108 is concave. Such a curvature enables adjustment of the inboard/outboard angulation of the bracket relative to the elongated curved alignment bushing—and the inboard/outboard cant of a vehicular roof at the point of attachment to a roof mounting feature—. More specifically, such embodiments are utilized together with the elongated curved alignment bushing 94 wherein the concave bottom surface of the roof mount bracket 108 contacts and accurately conforms to the curvature of the convex top/upper surface 96 of the bushing having a radius of curvature equal to that of the lower section of the roof mount bracket. The concave shape of the bottom surface of the lower section of the roof bracket mates with the convex top surface of the elongated bushing thereby enabling rotation of the roof bracket in an inboard/outboard manner upon the elongated bushing. This sliding relationship therefore provides for adjustment of the inboard/outboard angulation of the roof bracket of from about 0 to about 7.5 degrees. More specifically, such rotation enables a bracket, mounted upon, for example, a roof surface canted downward in the outboard direction, to be rotated upon the elongated curved alignment bushing in an inboard direction until the upper section of the bracket is perpendicular to the planar surface of the vehicle roof devoid of such a slope. Thus, the approximately 7.5 degrees of rotation of the bracket relative to the bushing enables the upper portion of the bracket to remain relative upright—even when the flat lower portion of the elongated bushing rests upon a portion of the vehicle roof having inboard/outboard slope. Such rotation thus enables the platform of the present invention to lie parallel to the horizontal plane of the roof regardless of inboard/outboard slope in the vicinity of roof mounting features. At the same time, the adjustability of the upper section of the roof bracket is provided by the vertically disposed elongated slot-like bracket apertures formed through the upper section of the mounting bracket. These slots enable the bracket to correct for fore/aft cant in which may be present at roof mounting feature locations.

In certain alternate embodiments, wherein an elongated alignment bushing is not utilized—due to absence of any inboard/outboard slope in the vicinity of roof mounting features—the lower section of the roof bracket may be formed and configure as a planar rectangular plate, devoid of curvature. The lower section of the bracket demonstrating the curvature discussed above extends outboard from the upper section at approximately 90 degrees from the center of the arc (in embodiments having a curved lower section). In embodiments devoid of such curvature, the upper and lower section of the bracket include this same 90 degree relation.

As shown in FIGS. 18 to 20b, in preferred embodiments of the present invention, the lower section of the roof mount bracket advantageously includes three apertures including a fore aperture 147, an aft aperture 149 and a center aperture 104. Although the fore and aft apertures may be formed as elongated slots running perpendicular to the long axis of lower portion of the bracket, in preferred embodiments, the fore and aft apertures are advantageously formed as square shaped openings so as to allow alignment with certain roof attachment features comprised of, for example, two threaded bores, two smooth bores or two studs at each attachment location, as discussed below. The fore/aft dimension of each square opening allows for variations in the fore/aft spacing between certain dual attachment features (such as, for example, paired bores, paired studs). The inboard/outboard dimension of the square openings allow—as do elongated slots and as discussed in more detail, below—, inboard/outboard rotational adjustment of the bottom surface 108 of the lower section 82 of roof mounting brackets having a curved shape in relation to an elongated curved alignment bushing so as to enable the bracket to correct for the inboard/outboard cant of certain vehicle roofs. The center aperture 104 is shaped as a slot oriented in an inboard/outboard manner. The center aperture is utilized with roof mounting features utilizing a single stud, smooth or threaded bore and each feature location. The slot-like shape of the center aperture of the lower section of the roof bracket enables, in embodiments incorporating an elongated curved alignment bushing, inboard/outboard sliding adjustment of the lower section 82 of roof mounting brackets in relation to an elongated curved alignment bushing to enable the position of the bracket to correct for inboard/outboard slope of a vehicle roof.

Figure 20A:
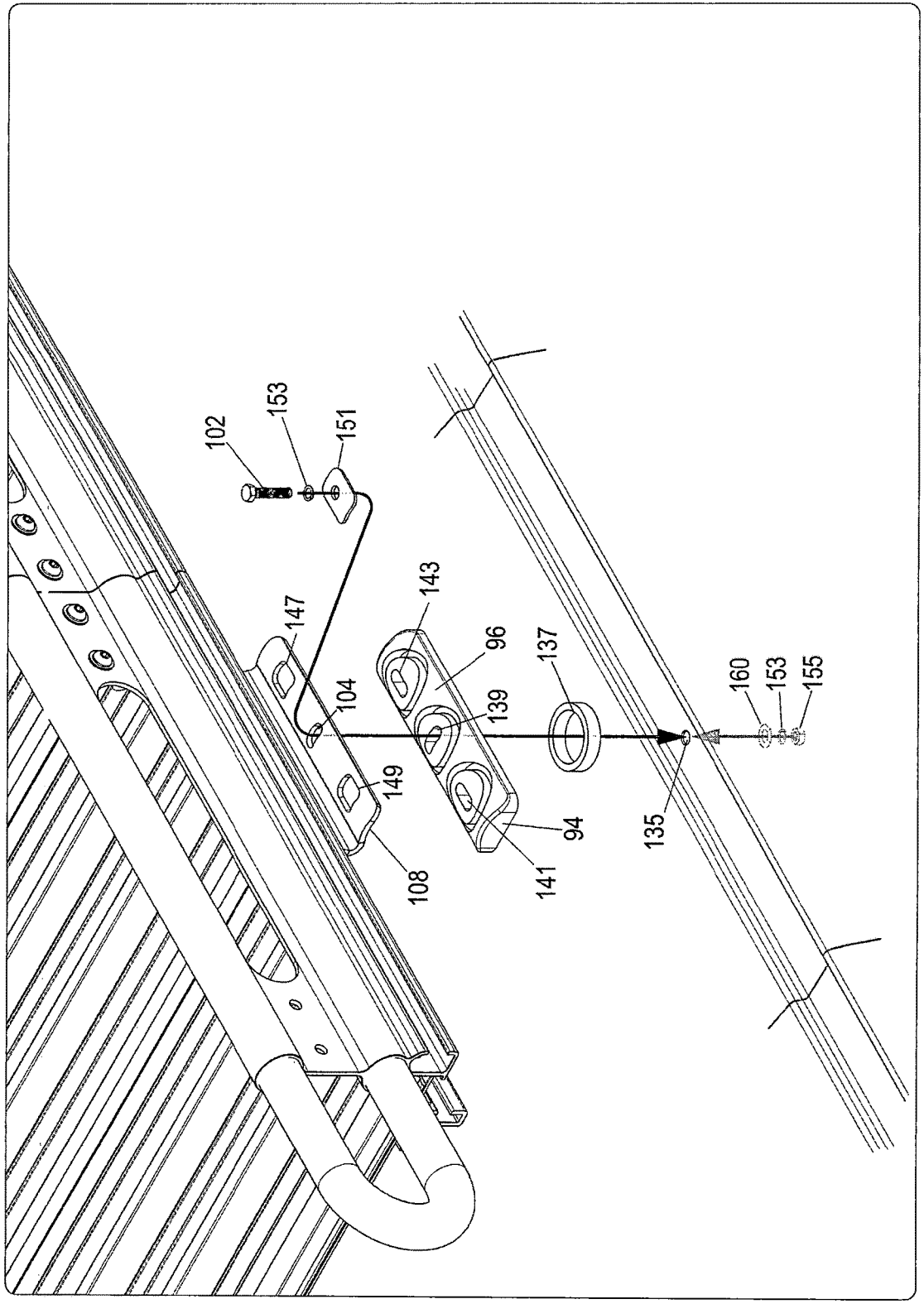
FIG. 20a is a top rear isometric partially exploded view of a preferred embodiment of the present invention illustrating attachment thereof to a vehicle roof having single smooth bore roof attachment features.
Figure 20B:
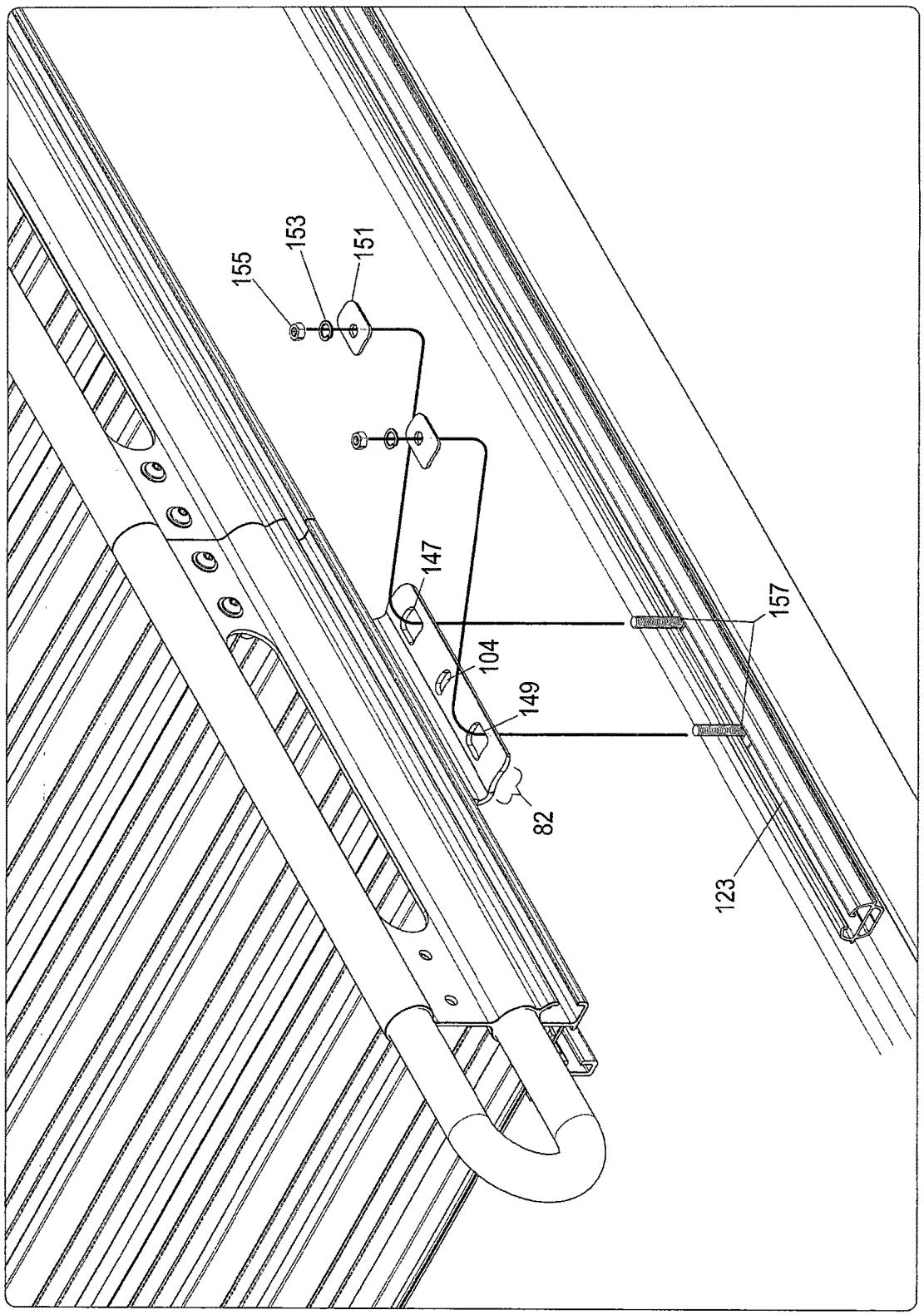
FIG. 20b is a top rear isometric partially exploded view of a preferred embodiment of the present invention illustrating attachment thereof to a vehicle roof having a pair of sliding flange bolts as roof attachment features.

In certain instances the vehicle roof upon which the platform of the present invention is to be mounted includes a roof channel 123 mounting feature which is shaped and configured to accept, for example, a pair of sliding flange bolts 157 (as illustrated in FIG. 20b). Such roof mounting features may be mounted so as to position such bolts perpendicular to the horizontal surface of the roof. Such channels may also be provided aftermarket and affixed proximal to the left and right extent of a vehicle's roof in such a manner as to enable such sliding flange bolts to also extend upward from the roof in perpendicular relation to the horizontal surface of the roof. In such instances, the lower section of the roof mount bracket 82 utilized may be devoid of curvature and the elongated curved alignment bushing is not required or utilized as there is no inboard/outboard roof curvature to correct. In such instances, the aforementioned fore 147 and aft 149 square shaped bores, formed proximal to the fore and aft end of the lower section 82 of the roof mount bracket, respectively, may be used to capture the threaded distal ends of the bolts, extending upward from such a roof channel wherein the heads of such bolts, are contained. After passing through the fore and aft bores of the lower section of the roof bracket, the bracket is secured to the sliding flange bolts utilizing, for example, a simple nut 155 and lock washer 153 and square washer 151, to secure the bracket (as well as the platform secured thereto) to the vehicle roof. As mentioned above, in such instances, use of the below described elongated alignment bushing is not required if they do not present an inboard or outboard cant in relation to the horizontal surface of the vehicle roof. If a cant is present, a curved lower roof bracket in conjunction with the above and below described elongated alignment bushing can correct for same.

As illustrated in FIGS. 18a through 20a, an elongated curved alignment bushing 94 is utilized in preferred embodiments of the present invention when inboard/outboard cant, in the region of attachment of the roof bracket to roof mounting features is present. The elongated curved alignment bushing is especially configured and shaped to have the same arc degree of curvature as the lower section of the roof bracket. It also demonstrates substantially the same fore to aft length and inboard/outboard width of the lower section of the roof mount bracket utilized therewith. It is preferred that this busing be configured to include three bores. More specifically, each bushing may include a central bore 139, a bore adjacent the aft portion of the bushing 141 and a bore adjacent the fore end 143 thereof. Such bores, enable, as discussed below, bolts, screws as well as other fasteners to pass through the bushing and hold it in place between the lower section of the roof mount and a roof feature, such as a threaded bore, to which the roof bracket is attached. In certain preferred embodiments, especially wherein a vehicle roof demonstrates inboard/outboard curvature in the area where roof attachment features are located, the elongated curved alignment bushing is advantageously utilized. The bushing, which demonstrates a convex upper surface, is initially placed under an in alignment with lower sections 82 of roof brackets of the present invention having a concave bottom surface 108. It is highly advantageous to form the elongated curved alignment bushing from a flexible plastic material such as, for example, a natural rubber or synthetic material such as neoprene rubber, or a plastic material so as a polyurethane or silicone plastic. Such resilient materials are capable of adapting to curved sections of a vehicle roof as well as being less likely to scratch the surface thereof. The curved convex upper portion of the bushing 96 in conjunction with the curved concave bottom surface of the lower section 108 of the roof bracket—it is in contact with—enables the roof bracket to compensate for right/left, or in other words, inboard/outboard cant of a vehicle roof they are mounted upon. For example, in some instances, there may be a roof wherein the right side roof mounting feature is a channel canted outboard (towards the right side a roof) wherein pairs of clip nuts are located. As illustrated in detail in FIG. 19a, in such an instance, the curved convex top surface 96 of the bushing enables, in conjunction with the concave bottom surface 108 of the curved lower portion of the roof bracket, adjustment of the bracket's inboard/outboard cant, or in other words, left/right cant 110 to be upright, or perpendicular to the horizontal plane of the vehicle roof not effected by such peripheral inboard/outboard cant. (See FIG. 16) More specifically, in order to allow the roof bracket to align the platform substantially parallel to the overall horizontal plane of the roof—rather than to tilt towards the right side or left side thereof, the elongated curved alignment bushing is aligned and a tangential contact with to the curved portion of the roof while the roof bracket is rotated inboard until the upper section of the bracket is upright and lies perpendicular to the horizontal plane of the vehicle roof. The square shape of the center aperture formed through the lower section of the roof bracket enables such adjustment. (In embodiment utilized with a single bore roof mounting feature, the center aperture formed through the lower section of the roof bracket may be a slot running perpendicular to the longitudinal axis of the lower section). After adjusting the bracket to an upright position, tightening of the bracket to the roof mounting feature causes the bottom surface of the flexible elongated curved alignment bushing to adapt to and become flush with the curved portion of the roof upon which is contact. As mentioned above, the term "horizontal plane of the roof" refers to the generally planar surface of a vehicle's roof at the central portion thereof as opposed to the peripheral portions of a vehicle roof which often includes curvature.

More specifically, if a roof feature to which the mount is to be affixed is located on a portion of a vehicle roof that slopes outboard at that location, the elongated curved alignment bushing is placed down so that the flat bottom surface of the busing is in contact with the curved portion of the roof in a manner similar manner to a line tangent to an arch. Thereafter, the curved bottom surface of the lower section of the roof bracket stays in position over a roof mounting feature while the curved upper surface of the bushing and curved bottom surface of the lower section of the roof mount bracket enables the bracket to be rotated, relative to the bushing in an arch 110 inboard until the upper portion of the bracket 80 lies perpendicular to the horizontal plane of the vehicle's roof. This movement requires, for example, the apertures formed in the elongated curved alignment bushing—discussed below—to be configured and shaped as a slot running generally perpendicular to the long axis of the elongated alignment bushing in regard to the center aperture 139. Although the apertures formed at the fore 143 and aft 141 portions of the bushing may also be formed as slots running parallel to the long axis of the elongated bushing, in certain preferred embodiments, these opening be formed as square openings. Both an elongated slot running parallel to the long axis of the bushing as well as a square shape of the fore and aft apertures can allow for vehicle variances in the spacing between roof mount features having, for example double bores or studs as well as enabling inboard/outboard adjustment of the bushing itself, if required as well as enabling inboard/outboard rotation of the bracket. In some instances, a square shaped fore and aft curved elongated alignment bushing may further enhance adjustability and rotation of the bracket in regards to inboard/outboard cant.

Figure 19A:
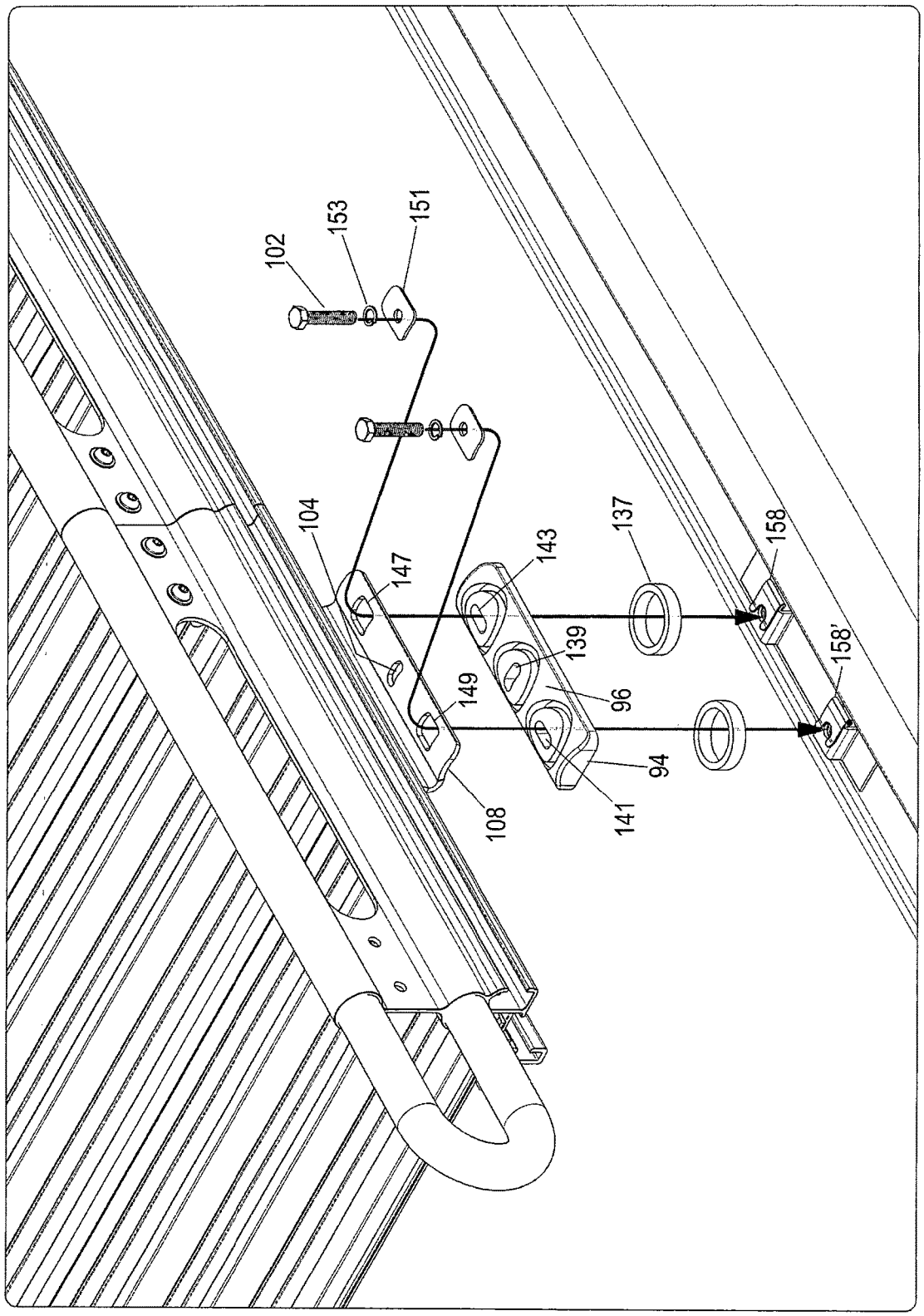
FIG. 19a is a top rear isometric partially exploded view of a preferred embodiment of the present invention illustrating attachment thereof to a vehicle roof having dual nut clip roof attachment features.
Figure 19B:
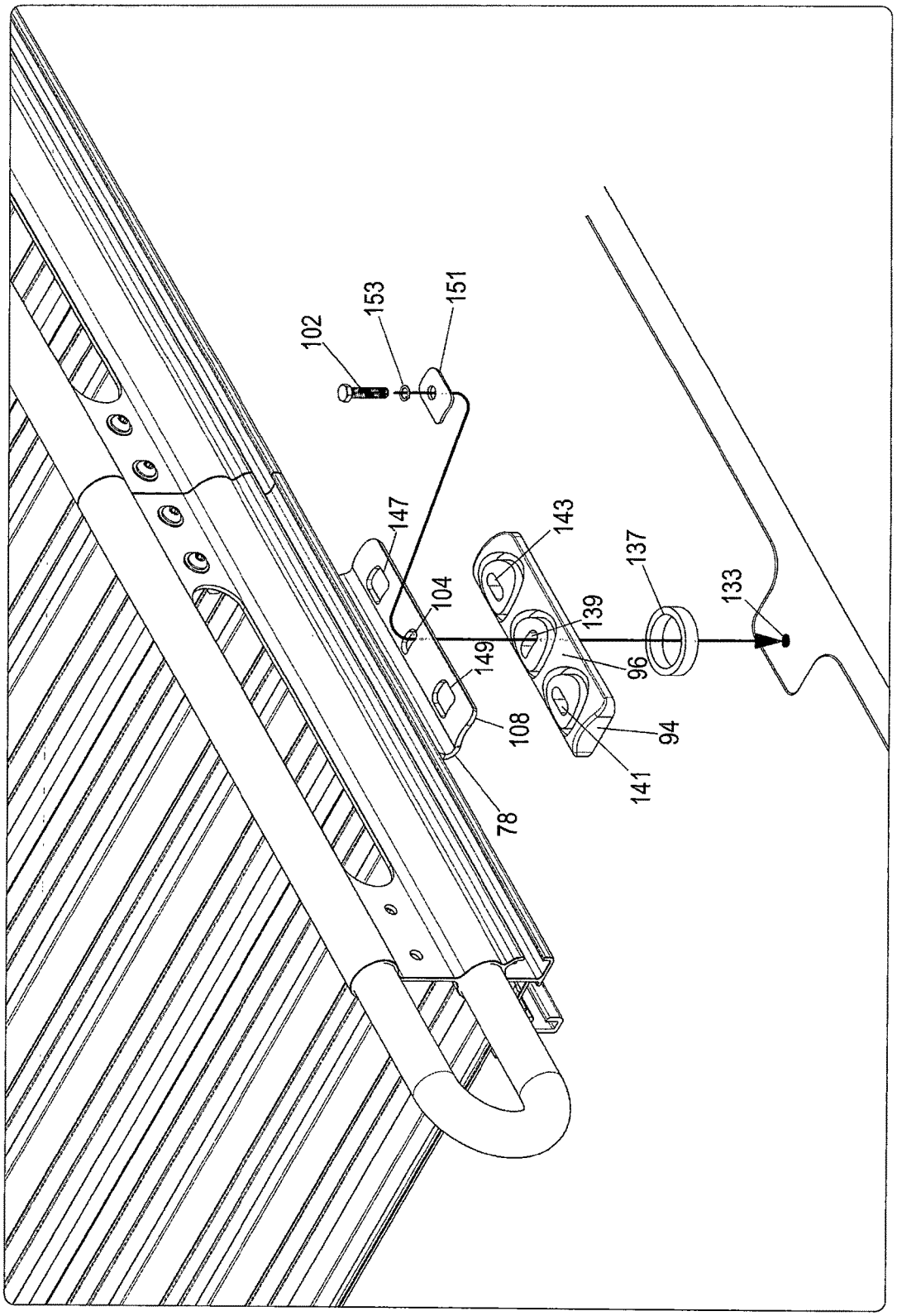
FIG. 19b is a top rear isometric partially exploded view of a preferred embodiment of the present invention illustrating attachment thereof to a vehicle roof having single threaded bore roof attachment features.

As illustrated in FIGS. 19b and 20a, in instances where a vehicle roof may be provided with simple individual mounting bores aligned longitudinally proximal to the left and right side of a vehicle roof, a roof mounting bracket 78 along with an elongated curved alignment bushing 94 may be utilized—especially in instances wherein the mounting bores are formed within sloped portions of a vehicle roof—. In such instances, each bracket will engage a single roof bore which may be threaded 133 or a smooth bore 135. For such configurations wherein the mounting feature is a threaded bore, a single machine bolt 102 or screw passing through a center slot shaped bore 104 formed through the lower section of the bracket 82 and then, thereafter, through a corresponding central bore 139 formed within the elongated curved alignment bushing 94 may be utilized to attach the bracket to the vehicle roof. A lock washer 153 and square washer 151 may be utilized to further stabilize and increase retention of the machine screw. Also a gasket 137 may advantageously placed between the elongated curved alignment bushing and vehicle roof in order to create a weather seal about the machine bolt or screw. It is advantageous, but not required, to form the central bore of the elongated curved alignment bushing as a slot running perpendicular to the fore/aft ends of the bracket. As mentioned above, the central slot shaped bore 104 formed through the lower section of the roof mounting bracket runs perpendicular to the long axis of the lower section 82 of the roof bracket. This slot shaped opening allows the concave bottom surface 108 of the lower section of the bracket to rotate along the convex top surface 96 of the elongated curved alignment bushing while, at the same time, the bottom surface of the elongated alignment bushing remains adapted to and in full contacted with the roof surface regardless of cant. This rotation enables the upper section of the roof bracket to be adjusted so as to lie substantially perpendicular to the horizontal plane of the vehicular roof (in areas devoid of such slope).

Figure 18A:
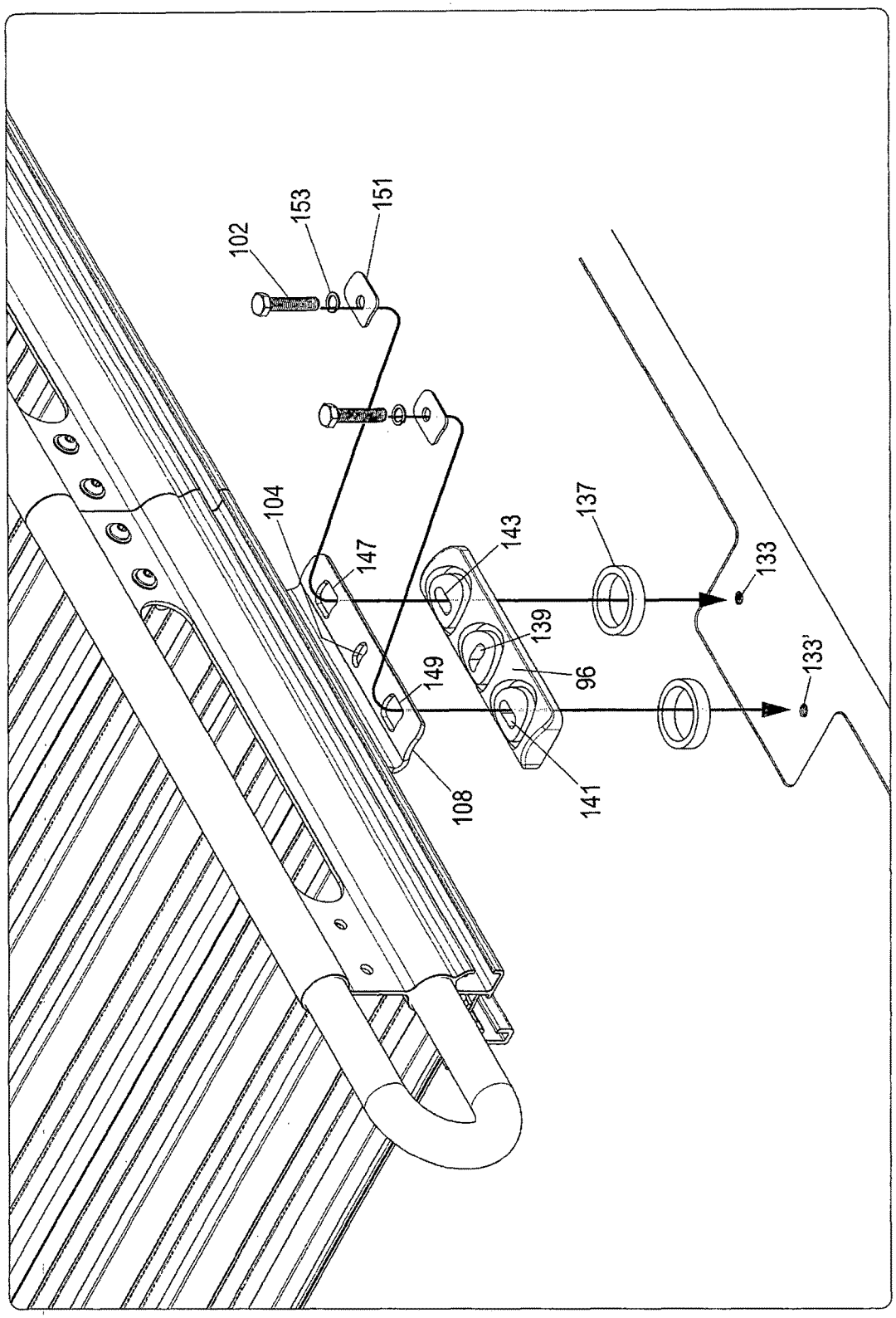
FIG. 18a is a top rear isometric partially exploded view of a preferred embodiment of the present invention illustrating attachment thereof to a vehicle roof having paired threaded roof attachment features.

In certain embodiments of the present invention wherein the modular platform is designed and configured for a vehicle having roof attachment features which are comprised of a linear series of dual (multiple pairs of) threaded bores 133/133' (see FIG. 18a) or dual nut clip fasteners 158 (see FIG. 19a). If such roof mounting features demonstrate an inboard/outboard cant, a roof bracket, of the present invention may compensate therefore in the same manner as described above. More specifically, a roof bracket having a curved lower section in combination with an elongated curved alignment bushing can correct for such slope so as to allow a platform supported by such brackets to lie parallel to the horizontal plane of a vehicle roof. More specifically, machine screws 102 for example, fitted, for example, with a square washer 157 and lock washer 153, are placed through the fore and aft bores 147/149 of the curved lower section of the roof bracket and then downwards through the fore 143 and aft 141 bores of the elongated curved alignment bushing bores. As mentioned above, the fore and aft bores of the lower section of the roof bracket and elongated curved alignment bushing, (which may also be referred to herein and through this specification as "apertures") are advantageously formed as square shaped openings to enable both inboard/outboard adjustment of the bracket (for correction of roof slope) as well as allowing for some variance in the space between linear arranged dual roof features. After passing through the fore and aft bores of the lower section of the roof bracket and the elongated curved alignment bushing, the threaded ends of the machine screws are inserted into, and loosely tightened into the threaded bores of the dual roof mounting features. Thereafter, as described above, the roof bracket may be rotated (see FIG. 16) in relation to the elongated curved alignment bushing so as to place the upper section of the roof bracket in a perpendicular relationship with the horizontal plane of the vehicle roof. Thereafter, the threaded screws may be firmly tightened into the threaded bores of the dual threaded bore roof features 133/133' as illustrated in FIG. 18a or the threads of the dual nut clip fasteners 158/158' as illustrated in FIG. 19a or single threaded bores as illustrated in FIG. 19b. As mentioned above, it certain embodiments, it may be advantageous to form the fore and aft bores of the elongated curved alignment bushing as slots running perpendicular to the long axis of the elongated bushing as square openings to allow for variations in inter-bore location of dual roof bore features as well as providing even further adjustment as to inboard/outboard alignment of the roof bracket. Embodiments of the roof mounting bracket and elongated curved alignment bushing of the present invention can be easily configured for vehicle roofs presenting virtually any configuration of threaded bores, smooth bores, channels and flanges.

As mentioned above, in certain situations the roof feature is a channel 123 that is formed or affixed to a vehicle roof in such a manner as to lie parallel to the plane of a vehicle roof. (See FIG. 20b) In such instances, fasteners, such as studs, bolts or flange assemblies that are retained therein in such a position that the longitudinal axis of such fasteners lies perpendicular to the horizontal plane of a vehicle roof. In such instances, neither a roof bracket having a curved lower section or an elongated curved alignment bushing are necessary in that there is no need to correct for roof slope or cant in the vicinity of the roof mounting feature. For example, in such embodiments wherein dual flange bolts 157 are contained within and extend upwards through a slot 124 communicating with said channel 123, the threaded portion of the flange bolts lie perpendicular to the plane of the vehicle roof. Therefore, by simply inserting the threaded ends of such bolts through the fore 147 and aft 149 bores of the lower section of the roof bracket, the upper portion of the roof bracket will also be aligned perpendicular to the horizontal plane of the vehicle roof. Thereafter, a square washer 151, lock washer 153 and nut 155 are utilized to secure the bracket to the flange bolts extending upward from the roof channel. Utilizing square shaped fore and aft bores will provide compensation for inter-bolt spacing variance as will forming such bores as slots running parallel to the long axis of the lower section of the roof bracket.

Figure 18B:
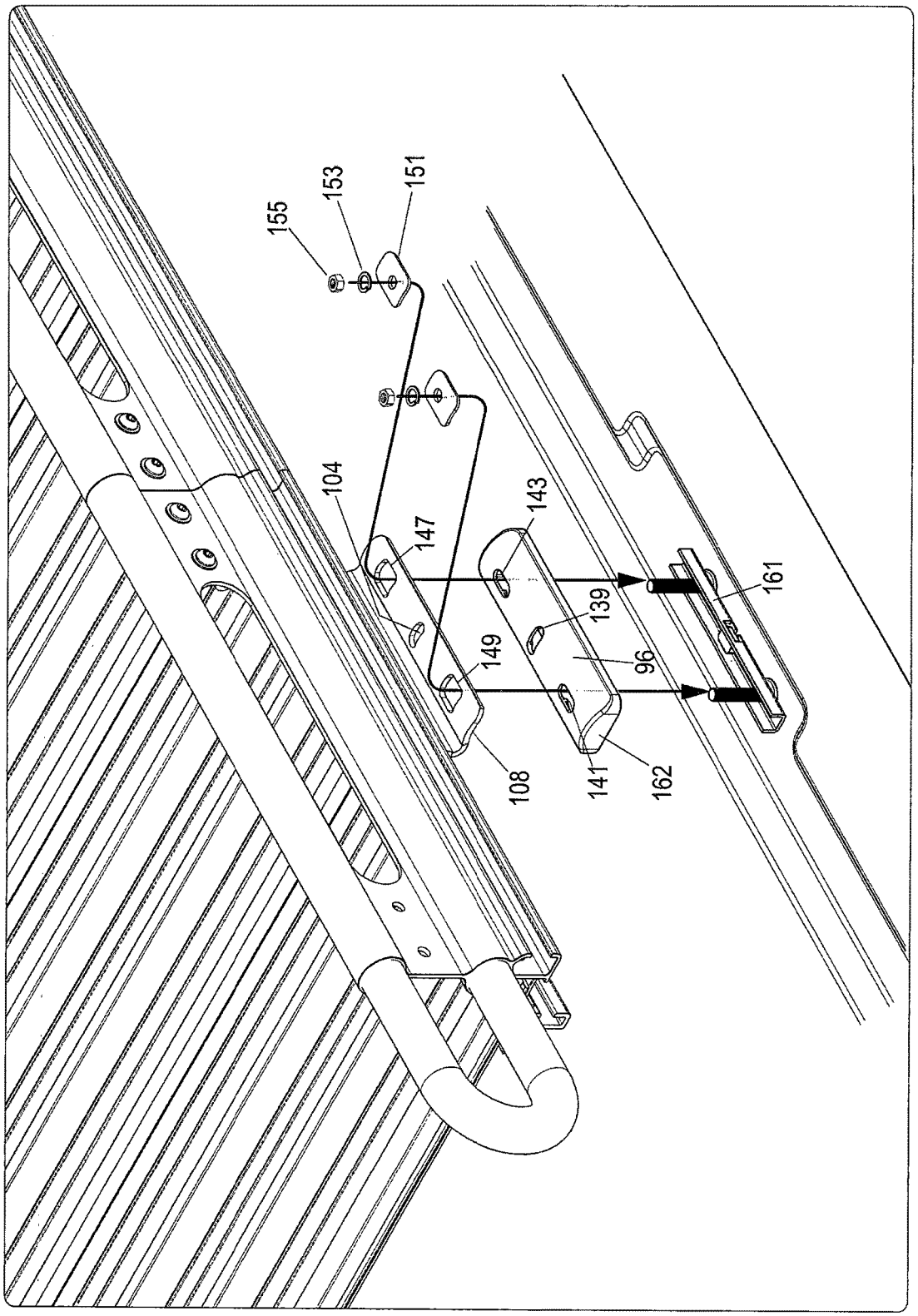
FIG. 18b is a top rear isometric partially exploded view of a preferred embodiment of the present invention illustrating attachment thereof to a vehicle roof having dual bolt roof top flange bracket roof attachment features.

In certain instances, as illustrated in FIG. 18b, the present invention may utilize a dual bolt roof top flange bracket which incorporates a central slot for engagement of a tab or bolt affixed to the vehicle roof 164 as a vehicle mounting feature. In such instances—wherein there is inboard/outboard roof slope at the position of the flange bracket, a roof bracket having a curved lower section (concave bottom surface) is utilized in conjunction with an elongated curved alignment bushing. More specifically, in such instances, an elongated curved alignment bushing is first lowered onto the dual bolts until it is flush with the flange. Thereafter, the lower section of the roof top bracket is lowered unto the dual bolt roof top bracket with the bolts passing upward through the fore 143 and aft 141 bores formed through the elongated curved alignment bushing as well as the fore 147 and aft 149 bores penetrating the lower section of the roof bracket. It is highly advantageous for the fore and aft bores penetrating the lower section of the roof top bracket to be formed, as discussed above, as slots positioned perpendicular to the long axis of the lower section of the bracket—to enable the roof bracket to be rotated in order to correct for inboard/outboard roof slope/cant in the vicinity of the flange. It is still further advantageous to form the fore and aft 147/149 apertures as square openings so as to allow the roof bracket to be fitted upon dual bolt flange bolts having varying inter-bolt distances—. It may be further advantageous to form the elongated curved alignment bushing to utilize fore and aft apertures 143/141 as slots running in a fore/aft direction to also allow for variances in inter-bolt spacing. Use of square shaped opening at the fore and aft apertures 143/141 may further improve adjustability of the roof bracket in regard to correcting for slop in the region of such dual bolt flange features. After being placed through the fore and aft apertures of the elongated curved alignment bushing and lower section of the roof bracket, a square washer 151, lock washer 153 and nut 155 threaded onto the bolt are utilized to attach the bracket to the feature Such fasteners are not tightened fully until any adjustment required as to the inboard/outboard cant of the bracket is adjusted, as described above. Although the roof bracket utilized in the present invention, in all embodiments and the elongated curved alignment bushing are shown providing attachment, and, in some instances correction of alignment of the cargo platform with the horizontal plane of a vehicle roof, both the bracket and elongated curved alignment bushing are fully capable of providing the same platform and/or cargo carrier roof attachment function for existing as well as future carriers and platforms. For such cargo carrying devices that are to be affixed to vehicle roofs demonstrating slope/cant in the vicinity of roof mounting features, the roof brackets and elongated curved alignment bushings can provide the same correction of the horizontal alignment of such carriers and platforms as discussed above.

I claim:

1. A modular vehicular roof top cargo platform that enables customized width and length dimensions, compensates for roof slope and provides improved strength and rigidity comprising:
  left and right side rails, each of the left and right side rails being formed by joining two or more side rail segments to provide left and right side rails having a selected length;
  left and right platform mounting rails, each of the left and right platform mounting rails being formed by joining two or more platform mounting rail segments so as to provide left and right platform mounting rails having a selected length;
  a plurality of panels, each of the plurality of panels having a top surface, a bottom surface, a right end, a left end, a fore end, an aft end, a width, and a length;
  a plurality of flange bolts;
  a plurality of flange bolt assemblies; and
  a plurality of roof mounting brackets, each of the plurality of roof mounting brackets having an upper section and a lower section extending therefrom;
  wherein each of the left and right side rails, and each of the two or more side rail segments from which the left and right side rails are assembled, include a lower "C" shaped channel section that is positioned and lies below a hollow lower tubular section, the hollow lower tubular section being positioned and lying below a side rail assembly section, the side rail assembly section being positioned and lying below a hollow upper tubular section, each side rail segment having a fore end and an aft end;
  wherein each of the two or more platform mounting segments, and each of the right and left platform mounting rails formed by assembling two or more platform segments, is shaped as an elongated bar having a top flange section, a bottom section, an inboard section, and an outboard section; wherein the outboard section shaped and configured to include a flange bolt assembly receiving channel and a slot communicating therewith for the receipt and retention therein of a flange bolt assembly;
  wherein the length of each of the plurality of panels is defined by a distance between the left end and the right end thereof, the width of each of the plurality of panels is defined by a distance between the fore end and the aft end thereof, the fore end of each of the plurality of panels being shaped, formed and configured to include a locking extension arm and the aft end of each of the plurality of panels being formed and configured to include an extension arm receiving groove; wherein the locking extension arm and the extension arm receiving groove enable the fore end of one panel to engage and be firmly attached to the aft end of an adjacent panel by compressing the adjacent panels together, whereupon a secure joint is formed therebetween and a flange bolt receiving channel, running the full length of the attached panels is formed below the secure joint, the right and left ends of each panel being shaped and configured to include a plurality of assembly screw receiving apertures; and
  wherein each of the plurality of roof mounting brackets is especially formed and configured to compensate for inboard/outboard as well as fore/aft slope of a vehicle roof at a location where the plurality of roof mounting brackets are affixed to the vehicle roof.

2. The modular vehicular roof top cargo platform of claim 1, wherein the upper section of the roof mounting bracket is configured as a flat, rectangular section having a fore and aft end with a longitudinal axis running therebetween and the lower section of the roof mounting bracket extends outboard from the upper section at an angle of about ninety degrees; wherein the upper section of the roof mounting bracket includes fore and aft apertures shaped and configured as slots running perpendicular to the longitudinal axis of the upper section, the lower section including a central, fore and aft aperture and a longitudinal axis.

3. The modular vehicular roof top cargo platform of claim 2, wherein the fore and aft apertures of the lower section of the roof mounting bracket are formed as slots running parallel to the longitudinal axis of the lower section.

4. The modular vehicular roof top cargo platform of claim 2, wherein the lower section of the roof mounting bracket is formed as a curved rectangular section having a convex upper surface and a concave bottom surface, a fore end, an aft end and a longitudinal axis running therebetween, the fore and aft apertures of the lower section are formed as slots running perpendicular to the longitudinal axis of the lower section.

5. The modular vehicular roof top cargo platform of claim 4 further comprising an elongated curved alignment bushing having a top surface, a bottom surface, a fore end, an aft end and a longitudinal axis running therebetween; wherein the top surface of the elongated curved alignment bushing is convex and especially shaped and configured to align with and conform to the concave bottom surface of the lower section of the roof mounting bracket and the elongated curved alignment bushing including a central aperture, a fore aperture and an aft aperture, the fore aperture and the aft aperture being formed as slots running parallel to the longitudinal axis of the elongated curved alignment bushing.

6. The modular vehicular roof top cargo carrier of claim 5 wherein the fore and aft apertures formed in the lower section of the roof mounting bracket are formed as square openings and the central aperture is formed as a slot running perpendicular to the longitudinal axis of the lower section of the roof mounting bracket.

7. The modular vehicular roof top cargo platform of claim 1 wherein the hollow lower tubular section, the side rail assembly section, and the hollow upper tubular section are longitudinally aligned.

8. The modular vehicular roof top cargo platform of claim 1 further comprising a plurality of inserts wherein the plurality of said inserts are especially shaped, formed and configured for secure placement, insertion and retention within the hollow upper tubular section and the hollow lower tubular section proximal to the right and left ends of the side rail segments wherein, when the plurality of inserts are placed within the hollow upper tubular section and hollow lower tubular section of adjacent side rail segments, upon compression, the adjacent side rail segments are aligned and form a strong butt joint therebetween.

9. The modular vehicular roof top cargo platform of claim 8 wherein each of the plurality of inserts includes tines extending therefrom to increase retention of the inserts within the hollow upper tubular section and the hollow lower tubular section and thus increases the strength of the butt joint formed thereby.

10. The modular vehicular roof top cargo platform of claim 8 further comprising a plurality of side rail segment assembly brackets wherein each of the plurality of side rail assembly brackets is shaped, formed and configured to include an upper section, a lower section, and a central planar section; wherein the upper section and the lower section are shaped and configured to each form a horizontally disposed assembly channel and the central planar section include at least one bracket attachment aperture formed through the side rail assembly bracket especially shaped, formed, and configured to align and mate with an assembly section bracket aperture so as to enable a machine screw to affix the side rail assembly bracket to a side rail segment adjacent the fore and aft ends thereof.

11. The modular vehicular roof top cargo platform of claim 10, wherein the plurality of inserts positions the horizontally disposed upper and lower assembly channels of adjacent side rail segment assembly brackets affixed to the assembly section of adjacent side rails into longitudinal alignment so that a machine screw, inserted into and engaging the upper and lower horizontally disposed assembly channels of the adjacent assembly brackets joins the brackets and further strengthens the butt joint.

12. The modular vehicular roof top cargo platform of claim 1 wherein the flange bolt receiving channel is especially shaped, formed, and configured to receive and contain flange bolts slidably therewithin and oriented so that a head portion of the flange bolt is contained within the flange bolt receiving channel and a threaded portion of the flange bolt is oriented downward and passes through a slot formed directly below the flange bolt receiving channel, the flange bolt being slideable, as to inboard/outboard position, within the flange bolt receiving channel enabling the threaded portion of the flange bolt to be placed in alignment and mate with assembly bores formed through the top flange of each of the left and right platform mounting rails.

13. The modular vehicular roof top cargo platform of claim 1 wherein the flange bolt assembly receiving channel is especially shaped, formed, and configured to receive and contain the flange bolt assembly slideably and oriented in such a manner as to contain a flange portion of the flange bolt assembly within the flange bolt assembly receiving channel and to position threaded portions of flange bolts extending therefrom so that the threaded portions of the flange bolts pass through a slot communicating with the flange bolt assembly receiving channel formed along the outboard surface thereof; wherein the flange bolt assembly and the flange bolt extending therefrom are fully adjustable as to the fore/aft position within the flange bolt assembly receiving channel to enable the flange bolt assembly and a roof bracket attached thereto, to be positioned adjacent to a roof mounting feature to which the bracket is to be affixed.

* * * * *